United States Patent [19]
Macaulay et al.

[11] Patent Number: 5,462,467
[45] Date of Patent: Oct. 31, 1995

[54] FABRICATION OF FILAMENTARY FIELD-EMISSION DEVICE, INCLUDING SELF-ALIGNED GATE

[75] Inventors: John M. Macaulay, Palo Alto, Calif.; Peter C. Searson, Baltimore, Md.; Robert M. Duboc, Jr.; Christopher J. Spindt, both of Menlo Park, Calif.

[73] Assignee: Silicon Video Corporation, Cupertino, Calif.

[21] Appl. No.: 118,490

[22] Filed: Sep. 8, 1993

[51] Int. Cl.⁶ .................................................. H01J 9/02
[52] U.S. Cl. ........................... 445/50; 156/644.1; 445/24
[58] Field of Search .................... 445/50, 24, 49; 156/644

[56] References Cited

U.S. PATENT DOCUMENTS

| | | |
|---|---|---|
| 3,303,085 | 2/1967 | Price et al. |
| 3,345,181 | 8/1968 | Shelton ................................. 313/309 |
| 3,407,125 | 10/1968 | Fehlner ................................. 205/161 |
| 3,497,929 | 3/1970 | Shoulders ............................... 445/52 |
| 3,562,881 | 2/1971 | Barrington et al. ...................... 445/24 |
| 3,665,241 | 5/1972 | Spindt et al. ....................... 313/309 X |
| 3,755,704 | 8/1973 | Spindt et al. ......................... 313/309 |
| 4,008,412 | 2/1977 | Yuito et al. .......................... 313/309 |
| 4,338,164 | 7/1982 | Spohr ...................................... 204/4 |
| 4,407,934 | 10/1983 | Kuchinsky et al. ....................... 445/24 |
| 4,668,957 | 5/1987 | Spohr ................................... 343/812 |
| 4,732,646 | 3/1988 | Elsner et al. .......................... 156/644 |
| 4,874,981 | 10/1989 | Spindt ................................ 313/309 |
| 4,897,338 | 1/1990 | Spicciati et al. ...................... 205/135 |
| 4,940,916 | 7/1990 | Borel et al. ....................... 313/309 X |
| 5,053,673 | 10/1991 | Tomii et al. ...................... 313/309 X |
| 5,142,184 | 8/1992 | Kane ............................... 313/336 X |
| 5,150,019 | 9/1992 | Thomas et al. ..................... 313/309 X |
| 5,150,192 | 9/1992 | Greene et al. .......................... 357/58 |
| 5,164,632 | 11/1992 | Yoshida et al. ........................ 313/309 |
| 5,170,092 | 12/1992 | Tomii et al. ...................... 313/309 X |
| 5,194,780 | 3/1993 | Meyer ............................. 313/309 X |
| 5,199,917 | 4/1993 | MacDonald et al. ................. 445/50 X |
| 5,211,707 | 5/1993 | Ditchek et al. ..................... 445/50 X |

FOREIGN PATENT DOCUMENTS

| | | | |
|---|---|---|---|
| 351110A1 | 1/1990 | European Pat. Off. | H01J 9/02 |
| 416625A2 | 3/1991 | European Pat. Off. | H01J 1/30 |
| 2951287A1 | 7/1981 | Germany | H01J 1/30 |
| 4209301C1 | 8/1993 | Germany | H01J 29/50 |
| WO92/02030 | 2/1992 | WIPO | H01J 1/30 |
| WO93/18536 | 9/1993 | WIPO | 313/311 |

OTHER PUBLICATIONS

Busta, "Vacuum Microelectronics—1992," *J. Micromech. Microeng.*, vol. 2, 1992, pp. 43–74.

Utsumi, "Keynote Address, Vacuum Microelectronics: What's New and Exciting," *IEEE Trans. Elect. Dev.*, Oct. 1990, pp. 2276–2283.

Betsui, "Fabrication and Characteristics of Si Field Emitter Arrays," *Tech. Dig. IVMC 91*, pp. 26–29.

Fischer et al., "Production and use of nuclear tracks: imprinting structure on solids," *Rev. Mod. Phys.*, Oct. 1993, pp. 907–948.

(List continued on next page.)

*Primary Examiner*—Kenneth J. Ramsey
*Attorney, Agent, or Firm*—Skjerven, Morrill, MacPherson, Franklin & Friel; Ronald J. Meetin

[57] ABSTRACT

A field-emission structure suitable for large-area flat-panel televisions centers around an insulating porous layer (24A) that overlies a lower conductive region (22) situated over insulating material of a supporting substrate (20). Electron-emissive filaments (30) occupy pores (28) extending through the porous layer. A conductive gate layer (34A) through which openings (36) extend at locations centered on the filaments typically overlies the porous layer. Cavities (38) are usually provided in the porous layer along its upper surface at locations likewise centered on the filaments.

In fabricating the structure, the pores are preferably formed by etching charged-particle tracks. Electrochemical deposition is employed to selectively create the filaments in the pores. Self-alignment of the gate openings to the filaments is achieved with charged-particle track etching and/or further electrochemical processing.

82 Claims, 12 Drawing Sheets

OTHER PUBLICATIONS

Spohr, *Ion Tracks and Microtechnology, Principles and Applications* (Viewig), edited by K. Bethge, 1990, pp. 246–255.

Whitney et al., "Fabrication and Magnetic Properties of Arrays of Metallic Nanowires," *Science*, 3 Sep. 1993, pp. 1316–1319.

Possin, "A Method for Forming Very Small Diameter Wires," *Rev. Sci. Instrum.*, vol. 41, 1970, pp. 772–774.

Williams et al., "Fabrication of 80 Å metal wires," *Rev. Sci. Instrum.*, Mar. 1984, pp. 410–412.

Shiraki et al., "Perpendicular Magnetic Media by Anodic Oxidation Method and Their Recording Characteristics," *IEEE Trans. Mags.*, Sep. 1985, pp. 1465–1467.

Tsuya et al., "Alumite Disc Using Anordic [sic] Oxidation," *IEEE Trans. Mags.*, Sep. 1986, pp. 1140–1145.

Arai et al., "Magnetic Properties of Iron Electro–Deposited Alumite Films," *IEEE Trans. Mags.*, Sep. 1987, pp. 2245–2247.

Cochran et al., "Low–voltage field emission from tungsten fiber arrays in a stabilized zirconia matrix," *J. Mater. Res.*, May/Jun. 1987, pp. 322–328.

Penner et al., "Preparation and Electrochemical Characterization of Ultramicroelectrode Ensembles," *Anal. Chem.*, 1 Nov. 1987, pp. 2625–2630.

Chakarvarti et al., "Morphology of etched pores and microstructures fabricated from nuclear track filters," *Nucl. Instr. & Meth. Phys. Res.*, vol. B62, 1991, pp. 209–115.

Kirkpatrick et al., "Vacuum field emission from a $SiTaSi_2$ semiconductor–metal eutectic composite," *Appl. Phys., Lett.*, Oct. 1991, pp. 2094–2096.

Hill et al., "A Low Voltage Field Emitter Array Cathode for High Frequency Applications," Abstract 6.5, 5th Int'l Vac. Microelec. Conf., 13–17 Jul. 1992, 2 pp.

Sune et al., "Fabrication of Silicon–Column–Field Emitters for Microwave Applications," *Tech. Dig., 6th Int'l. Vac. Microelec. Conf.*, 12–15 Jul. 1993, pp. 15–16.

Chakarvarti et al., "Microfabrication of metal–semiconductor heterostructures and tubules using nuclear track filters," *Micromech. Microeng.*, vol. 3, 1993, pp. 57–59.

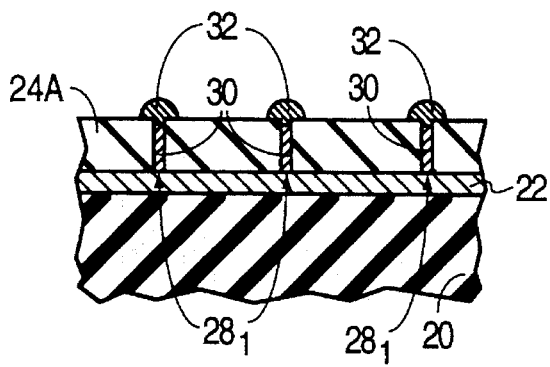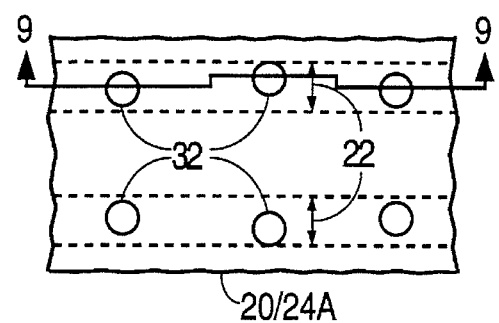
FIG. 9a  FIG. 10a
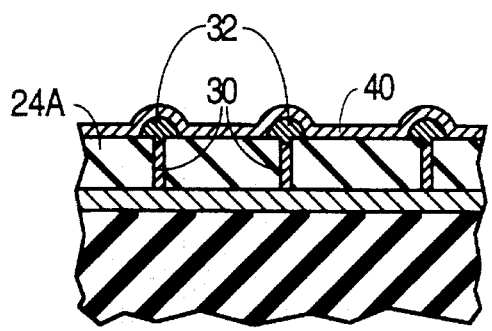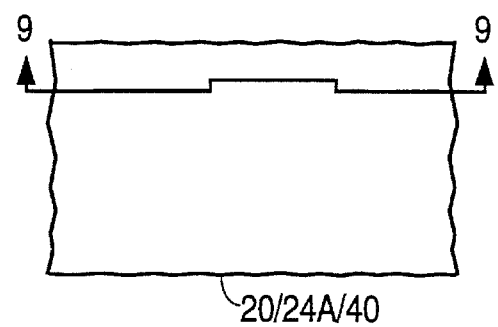
FIG. 9b  FIG. 10b
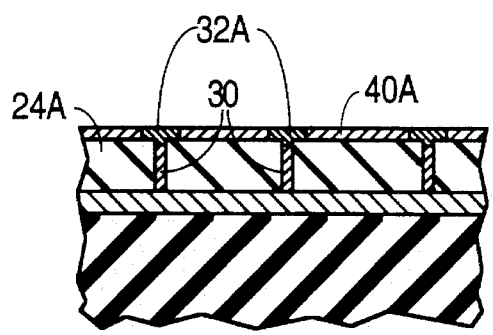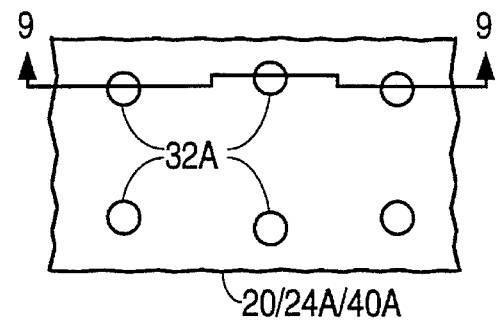
FIG. 9c  FIG. 10c

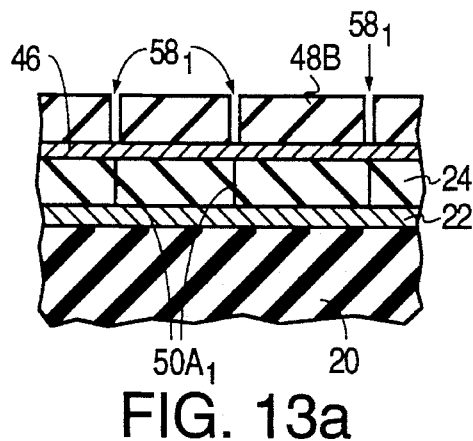
FIG. 13a
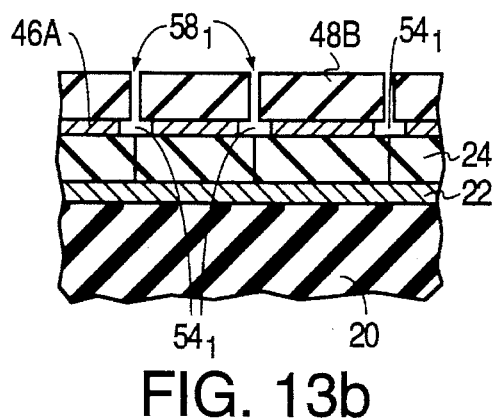
FIG. 13b
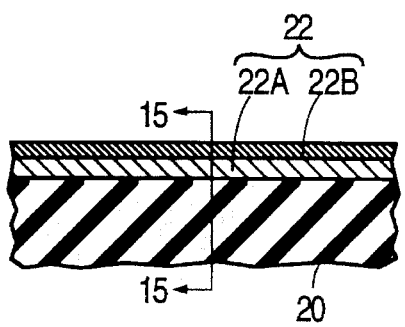
FIG. 14
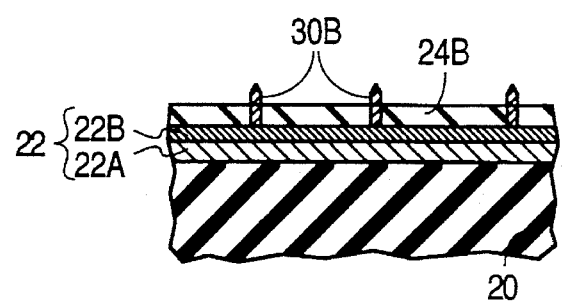
FIG. 16.1
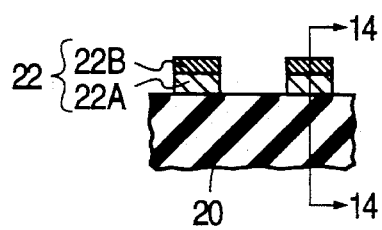
FIG. 15
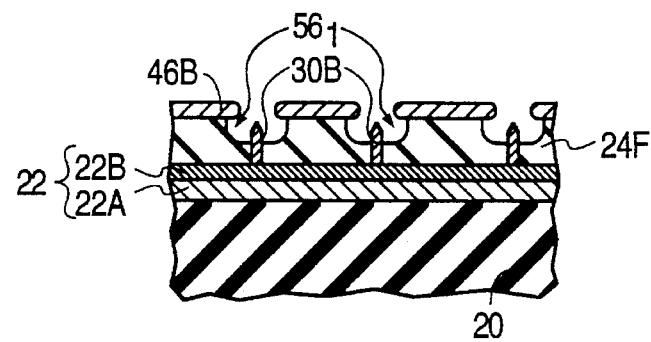
FIG. 16.2

 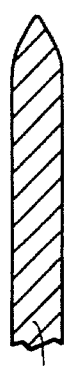  
30A/30B     30A/30B     30A/30B     30A/30B
FIG. 18.1    FIG. 18.2    FIG. 18.3    FIG. 18.4
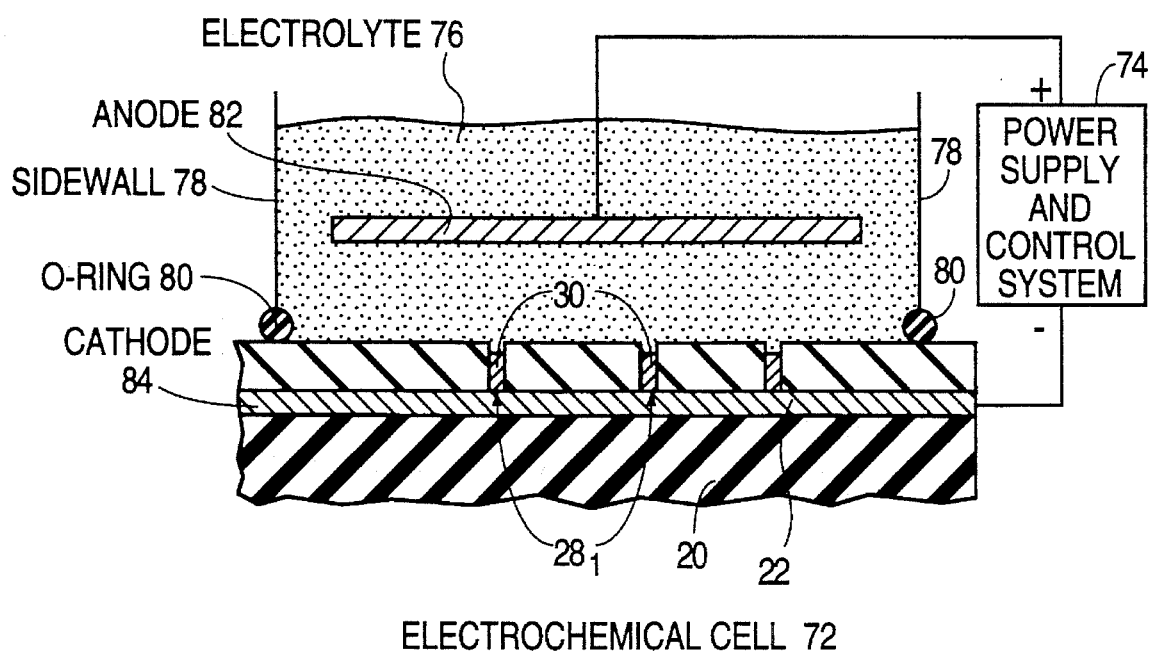
FIG. 19

FABRICATION OF FILAMENTARY FIELD-EMISSION DEVICE, INCLUDING SELF-ALIGNED GATE

FIELD OF USE

This invention relates to electron-emitting devices. More particularly, this invention relates to structures and manufacturing techniques for field-emission devices (or field emitters) suitable for products such as cathode-ray tubes of the flat-panel type.

BACKGROUND ART

A field-emission cathode is an electronic device that emits electrons when subjected to an electric field of sufficient strength. The electric field is created by applying a voltage between the cathode and an electrode, typically referred to as the anode or gate electrode, situated a short distance away from the cathode. Field emitters are employed in cathode-ray tubes of flat-panel televisions.

Yoshida et al, U.S. Pat. No. 5,164,632, discloses a field-emission structure in which solid elongated gold electron-emissive elements are situated in pores extending through an alumina (aluminum oxide) layer. An address line lying under the alumina layer contacts the lower ends of the electron-emissive elements. Their upper ends are pointed. A gate electrode situated above the electron-emissive elements extends slightly into the pores.

To manufacture their field-emitter structure, Yoshida et al anodically oxidize part of an aluminum plate to create a thin alumina layer having pores that extend nearly all the way through the alumina. An electrolytic technique is used to fill the pores with gold for the electron-emissive elements. The address line is formed over the filled pores along the alumina side of the structure after which the remaining aluminum and part of the adjoining alumina are removed along the opposite side of the structure to re-expose the gold in the pores. Part of the re-exposed gold is removed during an ion-milling process utilized to sharpen the electron-emissive elements. Gold is then evaporatively deposited onto the alumina and partly into the pores to form the gate electrode.

Greene et al, U.S. Pat. No. 5,150,192, discloses a field emitter in which hollow elongated electron-emissive elements extend through a thin electrically insulating substrate. The electron-emissive elements have pointed tips that protrude into cavities provided along the upper substrate surface below a gate electrode. A metal film lies along the lower substrate surface.

In fabricating their field emitter, Greene et al create openings partway through the substrate by etching through a mask formed on the bottom of the substrate. Metal is deposited along the walls of the openings and along the lower substrate surface. A portion of the thickness of the substrate is removed along the upper surface. The gate electrode is then formed by a deposition/planarization procedure. The cavities are provided along the upper substrate surface after which the hollow metal portions in the openings are sharpened to complete the electron-emissive elements.

A large-area field emitter for an application such as a flat-panel television screen where the diagonal screen dimension is 25 cm needs a relatively strong substrate for supporting the field-emission components extending across the large emitter area. The requisite substrate thickness is typically several hundred microns to 10 mm or more. Due to the ways in which Yoshida et al and Greene et al manufacture their field emitters, it would be quite difficult to attach those emitters to substrates of such thickness. Consequently, Yoshida et al and Greene et al are not suited for scaling up to large-area field-emission applications.

Busta, "Vacuum Microelectronics-1992," *J. Micromech. Microeng.*, Vol. 2, 1992, pp. 43–74, provides a general review of field-emission devices. Among other things, Busta discusses Utsumi, "Keynote Address, Vacuum Microelectronics: What's New and Exciting," *IEEE Trans Elect. Dev.*, Oct. 1990, pp. 2276–2283, who suggests that a filament with a rounded end is the best shape for a field-emission element. Busta also discusses Betsui, "Fabrication and Characteristics of Si Field Emitter Arrays," *Tech. Dig. IVMC* 91, 1991, pp. 26–29, who utilizes a lift-off technique in forming a field-emitter array. Also of interest is Fischer et al, "Production and use of nuclear tracks: imprinting structure on solids," *Rev. Mod. Phys.*, Oct. 1983, pp. 907–948, which deals with the use of charged-particle tracks in manufacturing field emitters according to a replica technique.

GENERAL DISCLOSURE OF THE INVENTION

The present invention furnishes an efficient, reliable field-emission structure fabricated according to a simple, accurate, and easily controllable process. The invention utilizes electrically conductive filaments as electron-emissive elements. Each filament is an elongated solid body whose length is considerably greater than its maximum transverse dimension. A self-aligned gate electrode is typically employed with the filaments.

More specifically, a lower electrically conductive region is situated over electrically insulating material of a substrate that provides support for the structure, especially when the lower conductive region includes a group of generally parallel lines. A porous electrically insulating layer lies over the lower conductive region. A multiplicity of electron-emissive filaments occupy corresponding pores extending through the porous layer. The lower end of each filament contacts the lower conductive region.

When a gate electrode is incorporated into the field emitter, the gate electrode is implemented with a patterned electrically conductive gate layer that lies over the porous insulating layer. Openings extend through the gate layer at locations centered on the filaments in such a manner that the filaments are separated from the gate layer. Cavities are normally provided in the porous layer along its upper surface at locations likewise centered on the filaments. The cavities extend partway through the porous layer. Each cavity is wider than the corresponding pore so that each filament protrudes from its pore into the corresponding cavity.

In manufacturing the field-emission structure of the invention, the porous layer is formed over the lower conductive region with pores extending fully through the porous layer. The pores are preferably created by etching charged-particle tracks formed through an electrically insulating layer situated over the lower conductive region. As a result, the pores are distributed at random locations relative to one another.

Electrically conductive filament material is subsequently introduced into the pores to form the electron-emissive filaments. This step is preferably done by electrochemically depositing the filament material into the pores starting from the lower conductive region. Due to the selective nature of the electrochemical deposition, filaments are created only in pores lying over the lower conductive region.

In one aspect of the manufacturing process, the gate layer is subsequently provided over the porous layer in a self-aligned manner. Two procedures are available for creating the gate layer in this way. In both procedures, electrically conductive caps are provided over the upper ends of the filaments. Each cap is formed over a corresponding one of the filaments and has a lateral periphery that encloses the lateral periphery of the corresponding filament along the bottom of the cap. An electrochemical deposition technique is preferably utilized to create the caps in this manner so that they are self-aligned to the filaments.

One of the procedures involves removing part of the thickness of the porous layer. Electrically conductive gate material is deposited over the remainder of the porous layer into the space generally below the space between the caps. The caps shield the underlying portions of the porous layer so as to substantially prevent the gate material from accumulating on the portions of the porous layer located below the caps. Some of the gate material invariably accumulates on the caps during the deposition. The caps are then lifted off along with any of the gate material on the caps. The remainder of the gate material forms the patterned gate layer.

In the other procedure, the gate layer is formed in the space between the caps. This entails depositing a blanket layer of the gate material over the porous layer and the caps, after which the gate material over the caps is removed, preferably by a planarization technique. The caps are then removed. The remainder of the gate material again forms the gate layer.

In another aspect of the manufacturing process, the pattern of openings through the gate layer is defined before the pores are created through the insulating layer. More specifically, the gate layer is first provided over the insulating layer. At this point, the gate layer does not have the openings, and the insulating layer does not have the pores.

The openings are now formed through the gate layer to expose corresponding surface portions of the insulating layer. This typically involves providing a further layer over the gate layer. Charged particles are passed through the three layers to form charged-particle tracks down to the lower conductive region. Each track has two segments: (a) a first segment extending through the insulating layer and (b) a second segment extending through the further layer in line with the first segment. The further layer is etched along the second track segments to form corresponding apertures through the further layer. The gate layer is subsequently etched through the apertures to form the openings. Each opening through the gate layer is thereby centered on a corresponding one of the apertures through the further layer.

The pores are then created through the insulating layer down to the lower conductive region. In particular, each pore is formed through part, but not all, of the exposed surface portion of the corresponding gate-layer opening in such a way that each pore is generally centered on the corresponding gate-layer opening but is considerably narrower than that opening along the bottom of the gate layer. Typically, the pores are created in a self-aligned manner by etching the insulating layer along the first track segments down to the gate layer. The filament material is now introduced into the pores to define the filaments.

During subsequent processing in both aspects of the manufacturing process, the cavities are created around the filaments by removing material of the porous insulating layer exposed through the openings in the gate layer. The upper ends of the filaments are preferably sharpened. The edges of the gate layer can also be rounded to complete the field-emitter fabrication.

There are many advantages to the present invention. For example, charged-particle tracks and electrochemical processing are employed in a judicious manner to create the electron-emissive filaments at selected locations and to self-align the gate layer to the filaments. No conventional lithographic patterning steps are needed for these two fabrication activities. The components of the field-emission structure can be manufactured at lateral dimensions on the nanometer scale.

The fabrication process of the invention is simple and highly accurate. In addition the process is inexpensive and well-suited for scaling up to manufacturing large-area field emitters for cathode-ray tubes in flat-panel televisions. In short, the invention provides a substantial advance over the prior art.

BRIEF DESCRIPTION OF THE DRAWINGS

FIGS. 9a, 9b, 9c, 9d, 9e, and 9f are cross-sectional front structural views representing another set of fabrication steps for adding a gate electrode to the structure of FIGS. 1e and 2e according to the invention.

FIGS. 10a, 10b, 10c, 10d, 10e, and 10f are plan views respectively corresponding to FIGS. 9a–9f. The cross sections of FIGS. 9a–9f are taken through stepped plane 9—9 in FIGS. 10a–10f.

FIGS. 13a and 13b are cross-sectional front structural views representing steps that can be substituted for the steps shown in FIGS. 11d and 11e.

FIG. 14 is a cross-sectional front structural view depicting how the initial structures of FIGS. 1a and 11a appear when the lower conductive region consists of a highly conductive portion and a highly resistive portion.

FIG. 15 is a cross-sectional side structural view corresponding to FIG. 14. The cross section of FIG. 14 is taken through plane 14—14 in FIG. 15. The cross section of FIG. 15 is taken through plane 15—15 in FIG. 14.

FIGS. 16.1 and 16.2 are cross-sectional front structural views respectively depicting how the final structures of FIGS. 3b and 11j appear when they contain the two-part lower conductive region of FIG. 14.

FIGS. 18.1, 18.2, 18.3 and 18.4 are cross-sectional longitudinal views of differently shaped electron-emissive filaments usable in the field-emission structures of the invention.

FIG. 19 is a functional diagram for the components of an electrochemical deposition system used in the invention.

Like reference symbols are employed in the drawings and in the description of the preferred embodiments to represent the same, or very similar, item or items.

DESCRIPTION OF THE PREFERRED EMBODIMENTS

Figure 1A:
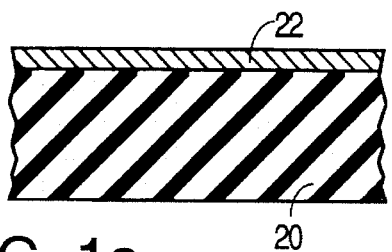
FIGS. 1a, 1b, 1c, 1d, and 1e are cross-sectional front structural views representing steps in fabricating a field-emission structure according to the invention.

The present invention makes extensive use of electrochemical deposition in which a material, usually a metal, is deposited from an (ionized) electrolyte in a (liquid) solvent. Electrochemical deposition is typically performed by passing current between a pair of electrodes to enable the material to accumulate on one of the electrodes. Nonetheless, electrochemical deposition can be performed in an electroless manner at zero applied potential.

Referring to the drawings, FIGS. 1a–1e and 2a–2e illustrate a process for manufacturing a field-emission cathode structure according to the teachings of the invention. The field-emission structure is typically used to excite phosphors on a face plate in a cathode-ray tube of a flat-panel television screen.

The starting point for the fabrication process is an electrically insulating substrate 20 consisting of ceramic or glass. Substrate 20 is typically configured as a plate having a largely flat upper surface and a largely flat lower surface substantially parallel to the upper surface.

Substrate 20 furnishes support for the field-emission structure. As such, the substrate thickness is at least 500 microns. In a 25-cm (diagonal) flat-panel television screen where substrate 20 provides substantially the sole support for the field emitter, the substrate thickness is typically 4–14 mm. If support struts are placed between the phosphor-coated face plate and the field emitter, the substrate thickness is typically 1–2 mm.

Figure 2A:
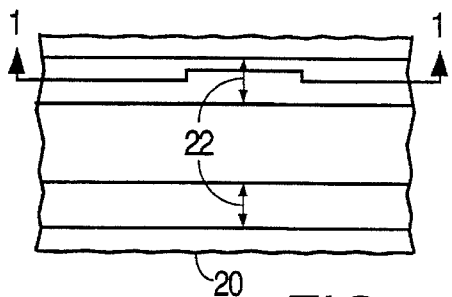
FIGS. 2a, 2b, 2c, 2d, and 2e are plan views respectively corresponding to FIGS. 1a–1e. The cross sections of FIGS. 1a–1e are taken through stepped plane 1—1 in FIGS. 2a–2e.
Figure 2B:
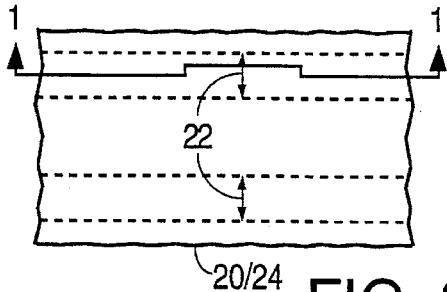

A lower electrically conductive region 22 is formed along the top of substrate 20 as indicated in FIGS. 1a and 2a. Lower conductive region 22 consists of a metal such as chromium. In this case, the thickness of region 22 is 0.05–1.5 micron. Other candidates for region 22 include tantalum, tungsten, and molybdenum.

Lower conductive region 22 is typically a patterned layer containing a group of parallel lines, of which two such lines are depicted in FIG. 2a. When region 22 is configured in this way, the final field-emission structure is particularly suitable for selectively exciting phosphors in a flat-panel television. These lines are typically 300 microns wide for the 25-cm monochrome flat-panel television example. Nonetheless, region 22 can be arranged in various other patterns, or can even be unpatterned.

A largely homogeneous electrically insulating layer 24 is formed on the top of the structure. See FIGS. 1b and 2b. Parts of insulating layer 24 are situated on both substrate 20 and lower conductive region 22. The thickness of layer 24 is 0.1–2.0 microns, typically 0.5 micron. Suitable materials for insulating layer 24 fall into three groups: (a) organic polymers such as polycarbonate, polystyrene, and cellulose acetate, (b) inorganic glasses such as phosphate, and soda-lime glasses, and (c) crystals such as mica and quartz.

Figure 1B:
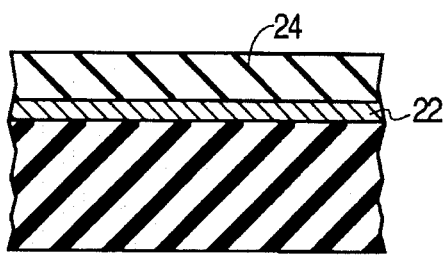
Figure 1C:
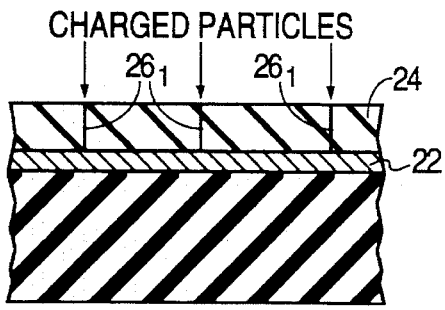
Figure 2C:
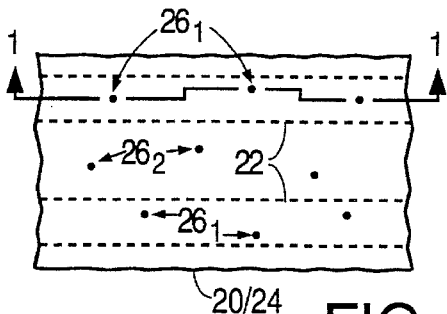
Figure 1D:
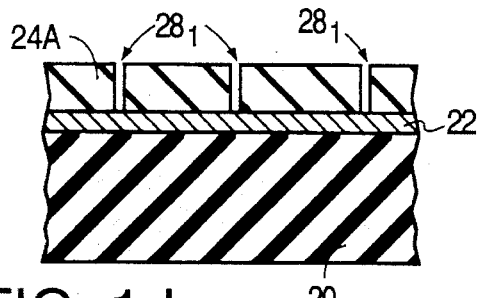

Insulating layer 24 is subjected to energetic charged particles that impinge on the top of layer 24 in a direction largely perpendicular to the lower surface of substrate 20 and thus in a direction generally perpendicular to the upper structural surface. The charged particles have sufficient energy to form straight tracks through layer 24 at random locations across layer 24. The charged-particle tracks constitute damaged zones created along the paths of the charged particles. As shown in FIGS. 1c and 2c, the tracks consist of (a) charged-particle tracks $26_1$ through the portions of layer 24 overlying conductive region 22 and (b) charged-particle $26_2$ through the portions of layer 24 directly overlying substrate 20.

Charged-particle tracks $26_1$ and $26_2$ (collectively "26") extend parallel to one another in a direction generally perpendicular to the upper structural surface. Although charged-particle tracks 26 are randomly distributed across insulating layer 24, they have a well-defined average spacing. The track density can be as much as $10^{11}$ tracks/cm$^2$. A typical value is $10^7$ tracks/cm$^2$ which yields an average track spacing of approximately 3 microns. For illustrative purposes, only a very small portion of tracks 26 are indicated in FIGS. 1c and 2c.

The charged particles penetrate into the material below insulator 24. Such penetration is not material here and, accordingly, is not shown in the drawings.

In a typical implementation, a charged-particle accelerator which forms a well-collimated beam of ions is employed to form tracks 26. The ion beam is scanned uniformly across insulating layer 24. The preferred charged-particle species is doubly ionized argon (Ar$^{++}$) at an energy of 8 MeV. Alternatively, tracks 26 could be created from a collimated source of nuclear fission particles produced, for example, by the radioactive element californium 252.

Insulating layer 24 is brought into contact with (e.g., by immersion) a suitable chemical etchant that attacks the damaged insulating material along tracks 26 much more than the undamaged material of layer 24. Pores $28_1$ and $28_2$ are thereby etched through layer 24 respectively along tracks $26_1$ and $26_2$. See FIGS. 1d and 2d. For illustrative purposes, the lateral dimensions of pores $28_1$ and $28_2$ (collectively "28") compared to the widths of the lines that form conductive layer 20 are greatly exaggerated in the plan-view drawings. The remainder of insulating layer 24 now constitutes homogeneous porous insulating layer 24A.

Figure 2D:
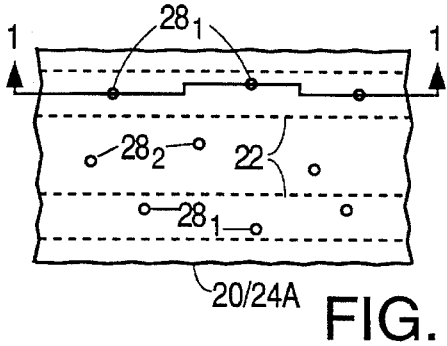

Pores 28 are generally circular in shape as viewed from the top in the plan view of FIG. 2d. Depending on how the track etching is done, pores 28 can be cylindrical or (slightly) conical in three dimensions. For purposes of illustration, pores 28 are represented as cylinders in the drawings. The pore diameter can vary from 4 nm to 2 microns. Preferably, the pore diameter lies in the range of 10–200 nm. A typical value is 100 nm.

The etchant used for creating pores 28 preferably does not significantly attack substrate 20 or conductive region 22. When components 20, 22, and 24A respectively consist of ceramic, chromium, and polycarbonate, the etching is done in 6.25 normal sodium hydroxide at 50° C. The etch time is 2–3 minutes for the typical 0.5-micron porous-layer thickness.

Solid electron-emissive metal filaments 30 are formed in pores $28_1$, which overlie conductive region 22, by electrochemically depositing a suitable filament metal. See FIGS. 1e and 2e. The deposition is performed in an electrochemical cell, described below, in which conductive region 22 acts as a deposition cathode. After bringing the structure into contact with the cell electrolyte and activating the cell, current flows between cathode 22 and a separate anode. The filament material uniformly builds up in pores $28_1$ starting from conductive region 22. The lower ends of filaments 30 contact region 22. Because pores $28_1$ are situated randomly across porous layer 24, filaments 30 are likewise situated at random locations above conductive region 22.

Figure 2E:
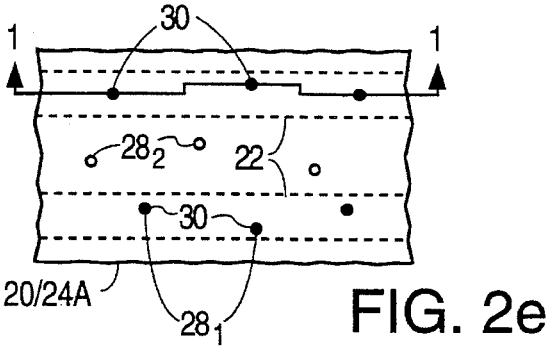

Substantially none of the filament material accumulates in pores $28_2$ directly above substrate 20 because there is no electrical contact at the bottoms of pores $28_2$. In FIG. 2e, the dark circles represent filaments 30 in filled pores $28_1$, while the light circles represent empty pores $28_2$. The use of conductive layer 22 as the cathode during the electrochemical deposition enables the deposition to be selective despite the fact that the pore locations are random.

Figure 1E:
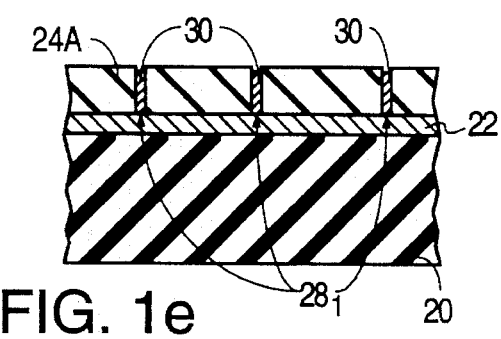

The electrochemical deposition is typically performed for a time sufficient to enable the upper ends of pores 30 to be nearly coplanar with top of porous layer 24A. This situation is illustrated in FIG. 1e. The deposition can, however, be performed for a longer time so that filaments 30 bulge slightly out of pores $28_1$ or for a shorter time so that the upper ends of filaments 30 are significantly below the top of layer 24A.

The upper ends of filaments 30 are preferably formed with a noble metal. In a typical implementation, the upper ends of filaments 30 consist of platinum when conductive region 22 is chromium. Other candidate noble metals for the upper filament ends are gold and palladium. The remaining portions of filaments 30 typically consist of the same (noble) metal as the upper ends but can be formed with another metal such as nickel, copper, or cobalt.

Elements 30 are true filaments for which the ratio of length to maximum diameter is at least 2 and normally at least 3. The length-to-maximum-diameter ratio is preferably 5 or more. Filaments 30 are typically cylinders of circular transverse cross section. Nonetheless, the transverse cross section can be somewhat non-circular. In any case, the ratio of maximum diameter to minimum diameter for each filament 30 is usually no more than 2.

Filaments 30 are all of substantially the same length. The filament length is 0.1–2.0 microns, typically 0.5 micron. In this regard, the average track spacing and, consequently, the average filament spacing are arranged to be somewhat greater than the filament length.

It is often advantageous for filaments 30 to extend out of pores $28_1$. It is also desirable for filaments 30 to have sharpened upper ends. Turning to FIGS. 3a, 3b, 4a, and 4b, they illustrate additional steps that can be performed on the structure of FIGS. 1e and 2e to accomplish these two objectives.

Figure 3A:
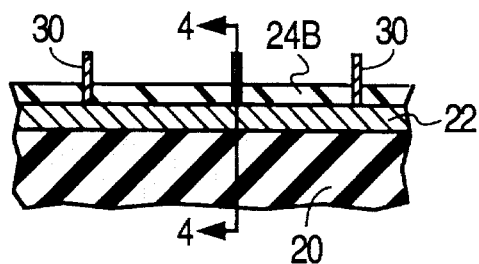
FIGS. 3a and 3b are cross-sectional front structural views representing a set of additional fabrication steps performable on the structure of FIGS. 1e and 2e according to the invention.
Figure 4A:
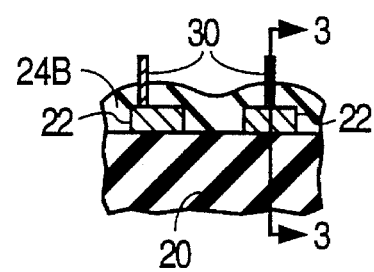
FIGS. 4a and 4b are cross-sectional side structural views respectively corresponding to FIGS. 3a and 3b. The cross sections of FIGS. 3a and 3b are taken through plane 3—3 in FIGS. 4a and 4b. The cross sections of FIGS. 4a and 4b are similarly taken through plane 4—4 in FIGS. 3a and 3b.

The first additional step is to uniformly remove part of the thickness of porous layer 24A with an etchant that does not significantly attack the filament metal. Preferably, the etchant does not significantly attack substrate 20 or conductive region 22. FIGS. 3a and 4a depict the structure at the end of this etching step. Item 24B is the reduced-thickness remainder of porous layer 24A.

Next, the upper ends of filaments 30 are sharpened by performing an electropolishing and etching operation. The electropolishing, which is done first, rounds the upper ends of filaments 30 and reduces their length somewhat. The etch sharpens the rounded filament ends.

The electropolishing is performed in an electrolytic cell in which filaments 30 constitute the anode. After bringing the structure of FIGS. 3a and 4a into contact with the cell electrolyte, a suitable potential is applied between (a) filaments 30 by way of lower conductive region 22 and (b) a separate cathode plate to cause current to flow between filaments 30 and the cathode plate. The electropolishing is typically conducted in an operational regime where the rate of metal removal increases with increasing electric field strength. Because the highest electric field, and thus the greatest material removal rate, for each filament 30 occurs at the outer top filament edge, the upper ends of filaments 30 become rounded.

Figure 3B:
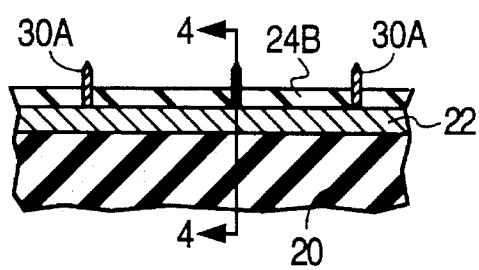
Figure 4B:
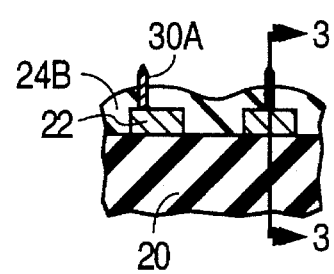

The filament etch is also typically done by bringing the field-emission structure into contact with the electrolyte of an electrolytic cell in which filaments 30 constitute the anode to which a driving voltage is applied via lower conductive region 22. The rate of metal removal varies with electric field strength and filament morphology in such a way that the rounded upper ends of filaments 30 become pointed. The etch can also be done according to a chemical technique. FIGS. 3b and 4b depict the final structure in which sharpened filaments 30A are the remainders of original filaments 30.

Figure 5A:
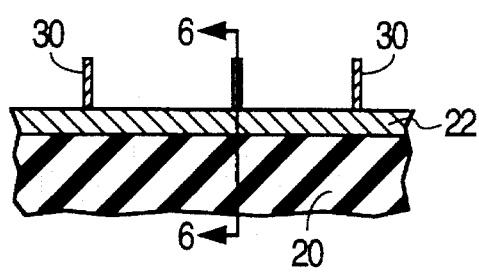
FIGS. 5a and 5b are cross-sectional front structural views representing another set of additional fabrication steps performable on the structure of FIGS. 1e and 2e according to the invention.
Figure 6A:
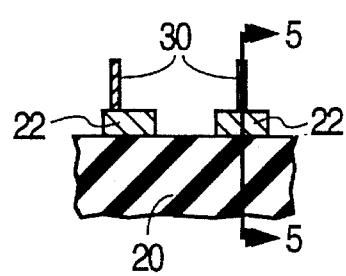
FIGS. 6a and 6b are cross-sectional side structural views respectively corresponding to FIGS. 5a and 5b. The cross sections of FIGS. 5a and 5b and taken through plane 5—5 in FIGS. 6a and 6b. The cross sections of FIGS. 6a and 6b are similarly taken through plane 6—6 in FIGS. 5a and 5b.

Alternatively, substantially all of porous layer 24A can be removed before sharpening filaments 30. FIGS. 5a, 5b, 6a, and 6b depict how this alternative procedure is performed starting from the structure of FIGS. 1e and 2e. Porous layer 24A is first removed as shown in FIGS. 5a and 6a. When components 22, 24A, and 30 respectively are chromium, polycarbonate, and platinum, the removal step is typically performed by dissolving layer 24A with dichloromethane.

Figure 5B:
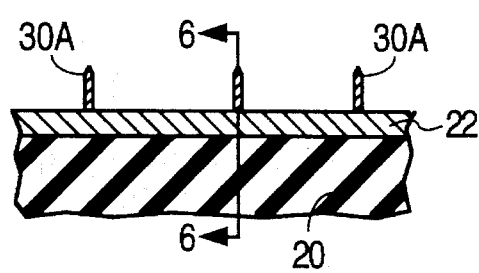
Figure 6B:
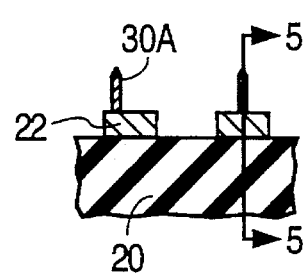
Figure 8A:
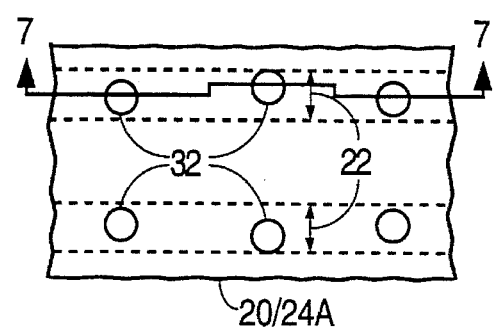
FIGS. 8a, 8b, 8c, 8d, 8e, and 8f are plan views respectively corresponding to FIGS. 7a–7f. The cross sections of FIGS. 7a–7f are taken through stepped plane 7—7 in FIGS. 8a–8f.

An electropolishing and etching operation is then performed to sharpen the upper ends of filaments 30 in the manner shown in FIGS. 5b and 6b. Items 30A are again the sharpened remainders of filaments 30.

FIGS. 7a–7f and 8a–8f illustrate a group of steps for providing the cathode structure of FIGS. 1e and 2e with a self-aligned gate-electrode structure. In this example, porous layer 24A preferably consists of an inorganic glass. Also, the initial thickness of layer 24A is typically 0.8 micron.

The first step in creating the gate electrode is to electrochemically deposit electrically conductive caps 32 respectively on filaments 30. See FIGS. 7a and 8a. Caps 32 are generally circular in shape as viewed from the top in FIG. 8a.

Each cap 32 is centered on the upper end of corresponding filament 30. Along the upper surface of porous layer 24A, each cap 32 also reaches a greater diameter than underlying filament 30. As a result, each cap 32 has a lateral periphery that encloses the lateral periphery of underlying filament 30 along the top of layer 24A. Typically, the average diameter of caps 30 along the top of layer 24A is at least 1.5 times the average diameter of filaments 30.

The electrochemical deposition to create caps 32 is performed in an electrochemical cell, again described below, in which filaments 30 (attached to lower conductive region 22) act as a cathode. After the structure has been brought into contact with the cell electrolyte and the cell has been activated, current flows between filaments 30 and a separate anode. The cap material thereby builds up on filaments 30 until the desired cap diameter is reached.

Caps 32 consist of a metal different from the filament metal along the upper ends of filament 30. In particular, the cap metal is selectively etchable with respect to the directly underlying filament metal. When filaments 30 consist of platinum, caps 32 are formed with a metal such as silver whose half-cell potential is less positive than that of platinum.

Figure 7A:
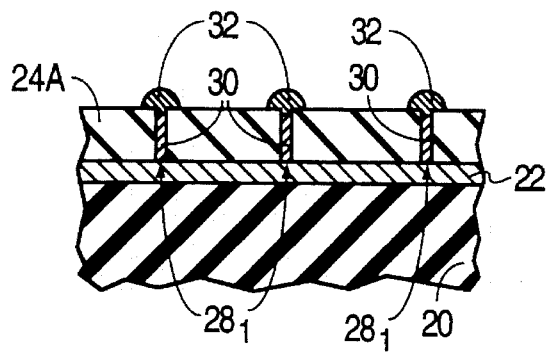
FIGS. 7a, 7b, 7c, 7d, 7e, and 7f are cross-sectional front structural views representing a set of fabrication steps for adding a gate electrode to the structure of FIGS. 1e and 2e' according to the invention.
Figure 7B:
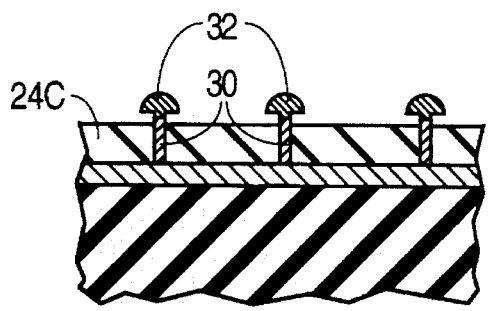
Figure 8B:
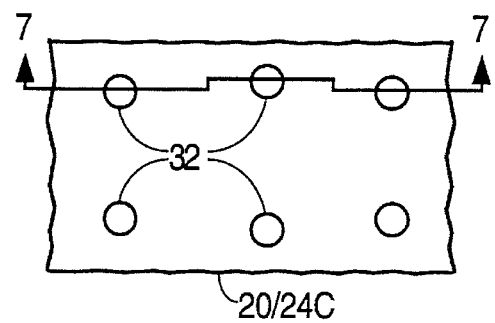

Next, part of the thickness of porous layer 24A is uniformly removed along the top of layer 24A to produce the structure shown in FIGS. 7b and 8b. Item 24C is the remainder of porous layer 24A. As illustrated in FIG. 7b, caps 32 are vertically separated from porous remainder 24C.

The porous-material removing step is performed with an etchant that does not significantly attack the filament or cap metal. Likewise, the etchant does not significantly attack substrate 20 or conductive region 22. The etching is conducted for a time sufficient to remove approximately 0.3 micron of the thickness of the porous material.

Figure 7C:
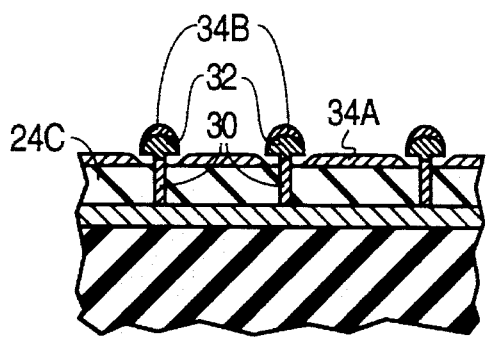
Figure 8C:
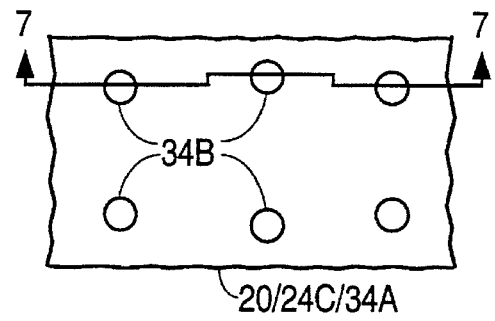

Electrically conductive gate material is now deposited on top of the structure to a thickness less than the removed thickness of the porous material. The gate-material thickness is typically 0.1 micron. The deposition is performed in a direction largely perpendicular to the lower surface of substrate 20 and thus in a direction generally perpendicular to the upper structural surface. As indicated in FIGS. 7c and 8c, a layer 34A of the gate material thereby accumulates on the portion of porous layer 24C not shielded by caps 32. A layer 34B of the gate material likewise normally accumulates on each cap 32. Importantly, caps 32 prevent substantially any of the gate material from accumulating on the portions of porous layer 24C below caps 32.

The criteria for selecting the gate material depends on the technique utilized below for removing caps 32. If the cap removal is done electrochemically, layer 34A which later becomes the gate electrode can be electrically protected. As a result, the gate material can generally be any metal that is not highly reactive. Suitable candidates include molybdenum, copper, and aluminum. If chemical or plasma etching is used for the cap removal, the gate material consists of a metal different from the cap metal. In particular, the cap metal must be selectively etchable with respect to the gate metal.

An evaporative deposition technique is typically used to form conductive layers 34A and 34B. The evaporative deposition is performed at low pressure in a suitable vacuum chamber. Layers 34A and 34B could also be formed by other direction-controllable physical deposition techniques such as sputtering.

Caps 32 are removed with an etchant that attacks the cap metal much more than the gate metal or the filament metal at the upper ends of filaments 30. In so doing, metal portions 34B are simultaneously removed. When regions 30, 32, and 34A respectively consist of platinum, silver, and molybdenum, the etching is typically performed by an electrochemical process in which metal layer 34A is held at a different potential than caps 32. This is achieved by applying one potential to metal layer 34A and another potential to lower conductive region 22. Alternatively, as mentioned above, caps 32 and overlying metal portions 34B can be removed with a chemical or plasma etchant.

Figure 7D:
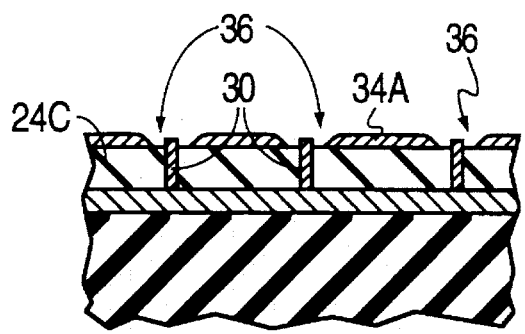
Figure 8D:
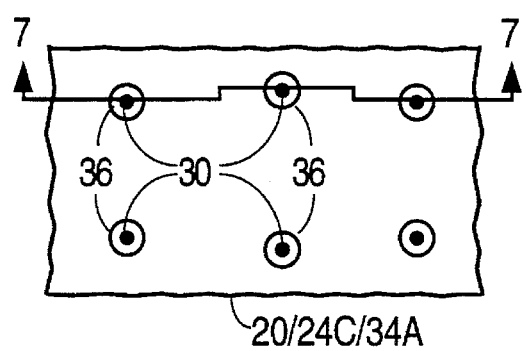

FIGS. 7d and 8d show the resultant structure in which the upper ends of filaments 30 are now exposed. Patterned metal layer 34A now constitutes the gate electrode for the field-emission structure. Gate electrode 34A has openings 36 respectively centered on filaments 30. Due to the protection supplied by caps 32 during the gate-metal deposition, each opening 36 is wider than corresponding filament 30. Consequently, gate electrode 34A is laterally separated from filaments 30.

The cathode/gate structure of FIGS. 7d and 8d can be directly utilized as a field emitter. Nonetheless, it is advantageous for filaments 30 to extend out of the porous material and for the upper ends of filaments 30 to be sharpened.

To this end, portions of porous layer 24C exposed through openings 36 are removed with an isotropic etchant to form cavities 38 respectively around filaments 30. See FIGS. 7e and 8e. The isotropic etchant used to create cavities 38 does not significantly attack any other portions of the structure. Filaments 30 now protrude outward beyond the remainder 24D of porous layer 24C. Each cavity 38 is considerably wider—i.e., has a considerably greater maximum transverse cross-sectional area—than corresponding pore $28_1$.

Figure 7E:
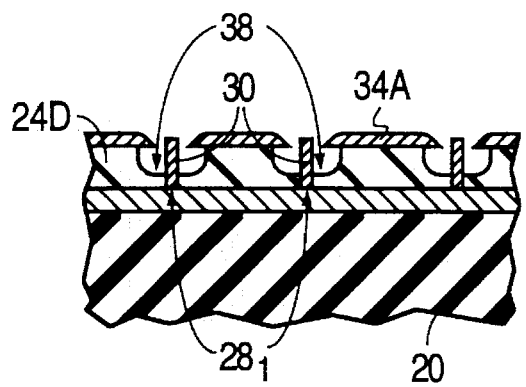
Figure 8E:
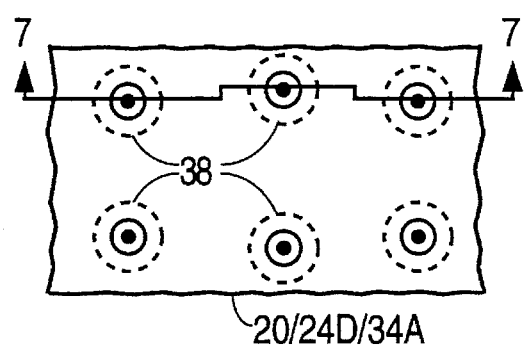

Cavities 38 typically extend partway down to lower conductive region 22. This situation is illustrated in FIG. 7e. However, cavities 38 can extend all the way down to region 22. In either case, by appropriately choosing the fabrication parameters, porous layer 24D is sufficient for supporting gate layer 34A.

An electropolishing and etching operation is performed to tailor and sharpen the upper ends of filaments 30. The electropolishing is done first in the manner described above to round the upper ends of filaments 30. By arranging the lower surface of substrate 20 to be approximately parallel to the cathode plate in the electrolytic cell, the upper ends of the longer ones of filaments 30 experience the highest electric fields. More material is thereby removed from the upper ends of the longer ones of filaments 30 than from the shorter ones during the electropolishing. Accordingly, the electropolishing also enables filaments 30 to become more uniform in length.

Figure 7F:
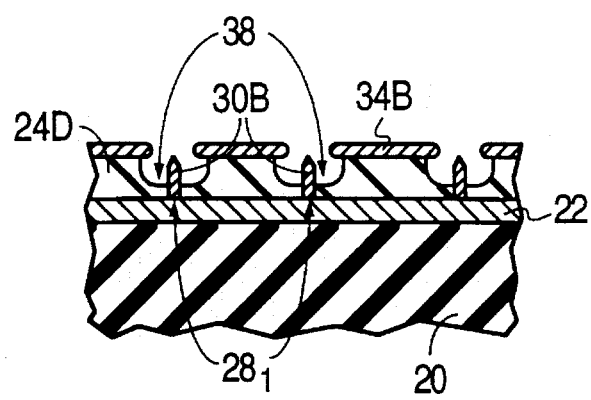
Figure 8F:
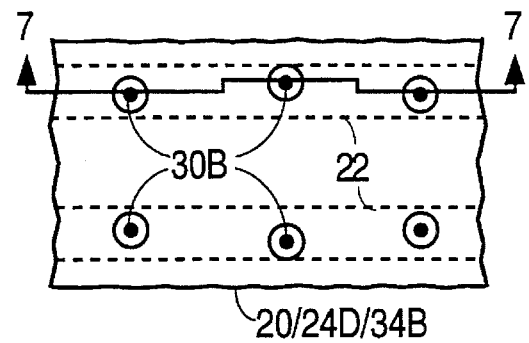

The filament etch is conducted in the manner described above to sharpen the rounded upper ends of filaments 30. If the etch is done by a chemical technique rather than an electrochemical technique, undesired etching of gate layer 34A can be avoided by applying an appropriate voltage to layer 34A and/or making suitable materials selection. FIGS. 7f and 8f illustrate the final field-emission structure in which sharpened filaments 30B are the remainders of filaments 30.

An electropolishing step is also typically performed to round the edges of patterned gate layer 34A overlying cavities 38. Layer 24A acts as the anode during this step, while filaments 30B serve as the cathode via lower conductive region 22. Patterned gate layer 34B in FIGS. 7f and 8f is the edge-rounded remainder of gate layer 34A.

Turning to FIGS. 9a–9f and 10a–10f, they depict an alternative group of steps for providing the cathode structure of FIGS. 1e and 2e with a self-aligned gate structure. Porous layer 34A is again formed with an inorganic glass. The thickness of layer 24A is typically 0.5 micron.

The first step for creating the gate structure in the alternative process is to electrochemically deposit caps 32 on filaments 30 in the same manner as described above. See FIGS. 9a and 10a which are respectively the same as FIGS. 7a and 8a. Caps 32 again consist of silver.

A blanket layer 40 of electrically conductive gate material is deposited on porous layer 24A and caps 32 along the top of the structure. See FIGS. 9b and 10b. The thickness of layer 40 is typically 0.1 micron.

The gate material consists of a metal selectively etchable with respect to the cap metal. Platinum can be utilized for the gate metal. The technique employed for the gate-metal deposition is not particularly important as long as the thickness of the portion of gate-metal layer 40 above porous layer 24A is relatively uniform.

The portions of gate-metal layer 40 overlying caps 32 are removed in a planarization operation by which the combination of caps 32 and layer 40 is provided with a largely flat upper surface. In so doing, small upper portions of caps 32 are also removed. FIGS. 9c and 10c depict the resulting structure in which items 32A are the remainders of caps 32. Item 40A is the remainder of gate-metal layer 40.

The planarization operation is performed in several steps. Firstly, a flowable material such as photoresist is deposited on the top of the structure. Secondly, the flowable material is flowed so that its upper surface becomes largely planar. Thirdly, an etchback is performed with an etchant that attacks the flowable material and the gate metal at approximately the same rate. The etchback is terminated when all of the flowable material has been removed. Because the etchant attacks the gate metal at approximately the same rate as the flowable material, the upward-protruding portions of gate-metal layer 40—i.e., the portions overlying caps 32—are simultaneously removed.

Caps 32A are removed with an etchant that does not significantly attack filaments 30 or metal layer 40A. See FIGS. 9d and 10d. Layer 40A, which now constitutes the gate electrode for the structure, has openings 42 respectively centered on filaments 30. Because each cap 32 was wider than corresponding filament 30, gate layer 40A is laterally separated from filaments 30.

Figure 9D:
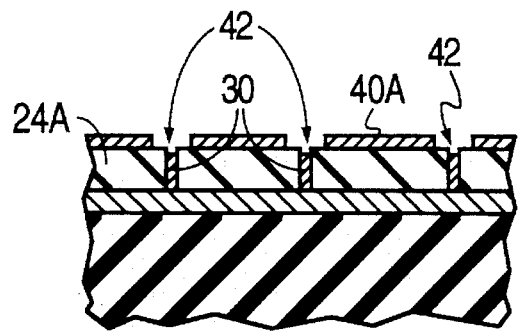
Figure 10D:
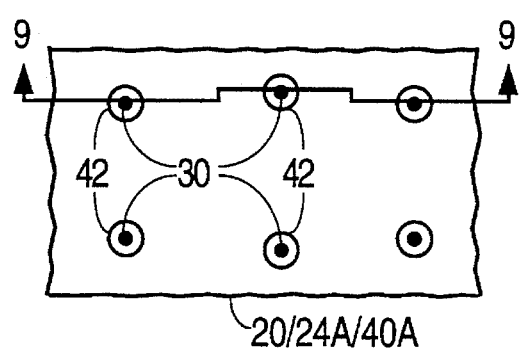
Figure 9E:
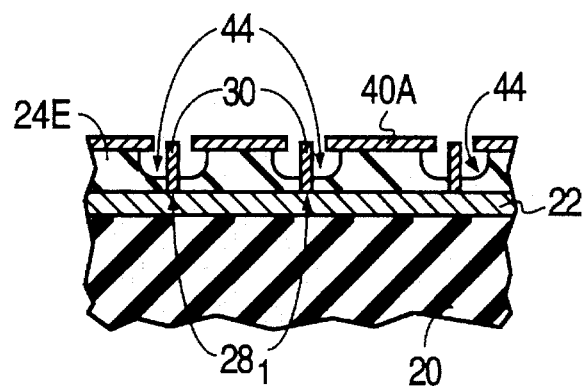
Figure 10E:
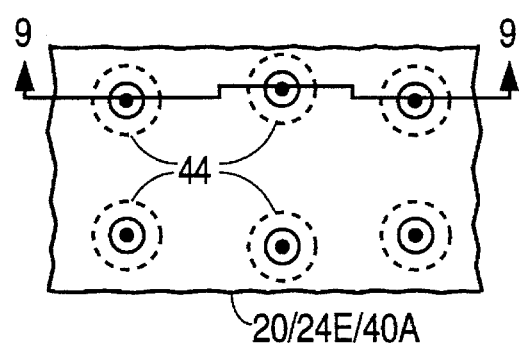

As with the cathode/gate structure of FIG. 7d and 8d, the cathode/gate structure of FIGS. 9d and 10d can be directly employed as a field emitter. However, it is similarly advantageous to further process the cathode/gate structure of FIGS. 9d and 10d in the same manner as that of FIG. 7d and 8d. Accordingly, portions of porous layer 24A exposed through openings 42 are removed with an isotropic etchant to form cavities 44 around filaments 30 as shown in FIGS. 9e and 10e. Filaments 30 protrude outward beyond the remainder 24E of porous layer 24A. Each cavity 44 is considerably wider than corresponding pore $28_1$.

Cavities 44 typically extend partway down to lower conductive region 22. FIG. 9e illustrates this situation. As in the previous process embodiment, cavities 44 can also extend fully down to conductive region 22.

Figure 9F:
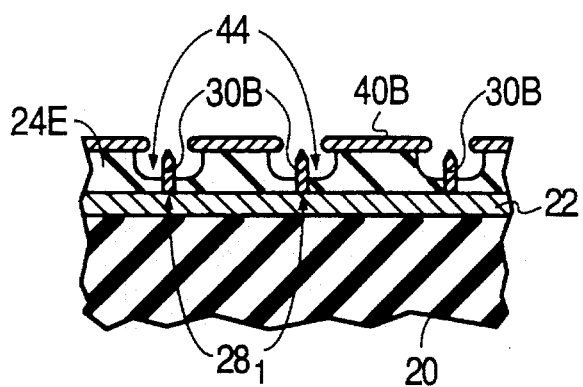
Figure 10F:
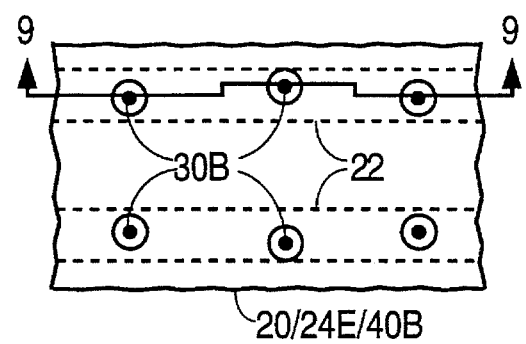
Figure 11A:
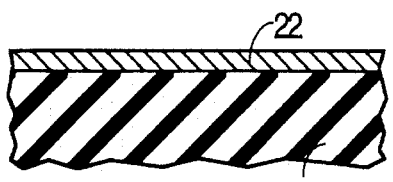
FIGS. 11a, 11b, 11c, 11d, 11e, 11f, 11g, 11h, 11i, and 11j are cross-sectional front structural views representing steps in fabricating a gated field-emission structure according to the invention.

An electropolishing and etching operation is performed to adjust and sharpen the upper ends of filaments 30. See FIGS. 9f and 10f. Items 30B again are the sharpened remainders of filaments 30. An additional electropolishing step is typically also done to round the edges of patterned gate layer 40A overlying cavities 44. Item 40B in FIGS. 9f and 10f is the edge-rounded remainder of gate layer 40A.

FIGS. 11a–11j and 12a–12j illustrate a further procedure for manufacturing a gated field-emission structure according to the teachings of the invention. This field emitter is structurally similar to both that of FIGS. 7f and 8f and that of FIGS. 9f and 10f. Likewise, the field emitter fabricated according to the process of FIGS. 11a–11j and 12a–12j is typically used for exciting phosphors in a flat-panel television.

Figure 12A:
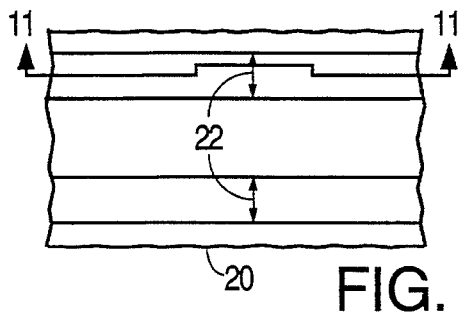
FIGS. 12a, 12b, 12c, 12d, 12e, 12f, 12g, 12h, 12i, and 12j are plan views respectively corresponding to FIGS. 11a–11j. The cross sections of FIGS. 11a–11j are taken through stepped plane 11—11 in FIGS. 12a–12j.

The starting point again is insulating substrate 20 over which lower conductive region 22 is provided. See FIGS. 11a and 12a. Substrate 20 and region 22 have the characteristics given above. In particular, region 22 typically contains a group of largely parallel lines, two of which are shown in FIG. 12a.

Insulating layer 24 is again formed on top of the structure. See FIGS. 11b and 12b. Layer 24 likewise has the characteristics given above since charged-particle tracks are later formed through it.

Figure 11B:
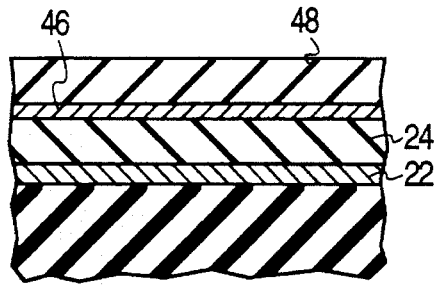
Figure 12B:
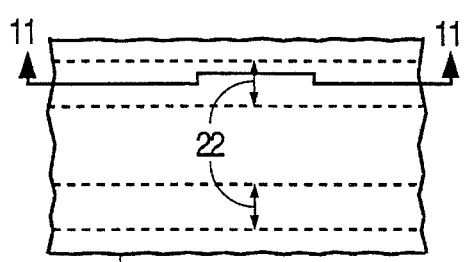

At this point, the process of FIGS. 11a–11j and 12a–12j deviates from the earlier-described fabrication processes of the invention. A blanket electrically conductive layer 46, which later becomes the gate electrode, is formed on the top of insulating layer 24 as indicated in FIG. 11b. Conductive layer 46 is typically 0.05 micron in thickness. Layer 46 consists of a metal such as molybdenum, copper, or aluminum. The method for creating layer 48 is not particularly critical as long as its thickness is relatively uniform. Layer 46 is typically formed by a physical vapor deposition technique.

A further electrically insulating layer 48 is formed on the top of conductive layer 46. Again see FIG. 11b. Insulating layer 48 is in the range of 0.2–0.5 microns in thickness. As with insulating layer 24, layer 48 consists of (a) an organic polymer such as polycarbonate, polystyrene, or cellulose acetate, (b) an inorganic glass such as phosphate, quartz, or soda-lime glass, or (c) a crystal such as mica or quartz. Although there are some implementations in which layer 48 consists of the same insulator as layer 24, layer 48 is normally formed with an insulator that is selectively etchable with respect to layer 24.

Figure 11C:
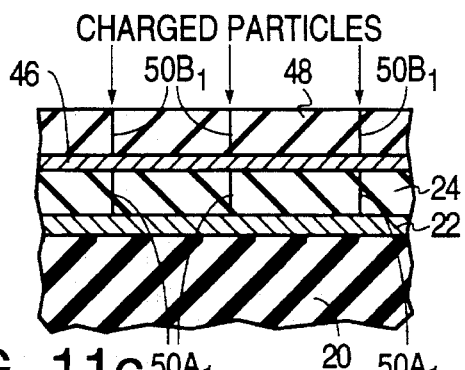
Figure 12C:
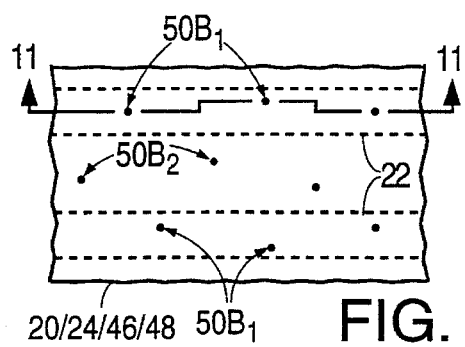

The structure is now subjected to energetic charged particles that impinge on the top of insulating layer 48 in a direction largely perpendicular to the (unshown) flat lower surface of substrate 20 and thus in a direction generally perpendicular to the upper structural surface. The charged particles pass through layers 48, 46, and 24 into the underlying material to form straight tracks through insulating layers 24 and 48 at random locations. FIGS. 11c and 12c illustrate the track formation. The charged-particle tracks again constitute damaged zones along the particle paths.

The charged-particle tracks are indicated by reference symbols beginning with "50" in FIGS. 11c and 12c. Each track is divided into (a) a "50A" segment extending through insulating layer 24 and (b) a "50B" segment extending through insulating layer 48 in a straight line with the 50A segment. Although the charged particles pass through metal layer 46, they do not significantly damage layer 46 and therefore do not create charged-particle tracks through layer 46. The tracks fall into two categories: (a) segments $50A_1$ and $50B_1$ (collectively "$50_1$") extending respectively through portions of layers 24 and 48 overlying lower conductive region 22 and (b) segments $50A_2$ and $50B_2$ (collectively "$50_2$") extending respectively through portions of layers 24 and 48 not overlying region 22.

As with charged-particle tracks 26 in the previous fabrication processes of the invention, charged-particle tracks $50_1$ and $50_2$ (collectively "50") extend parallel to one another in a direction generally perpendicular to the upper structural surface. Tracks 50 have the same characteristics—e.g., size and spacing—as tracks 26. Tracks 50 are also formed in the same way as tracks 26. To simplify the illustration, only a small portion of tracks 50 are indicated in FIGS. 11c and 12c.

The damaged insulating material along track segments 50B in insulating layer 48 is removed by bringing layer 48 into contact with a suitable chemical etchant that attacks the damaged 50B track material much more than the undamaged material of layer 48. As a result, generally circular pores are etched through layer 48 along segments 50B down to metal layer 46. The etchant preferably does not significantly attack any of the other parts of the field-emission structure.

The etch is continued into the largely undamaged material of insulating layer 48 to broaden the pores. Apertures $52_1$ and $52_2$ are thereby respectively created along track segments $50B_1$ and $50B_2$. See FIGS. 11d and 12d. Apertures $52_1$ and $52_2$ (collectively "52") expose corresponding portions of the upper surface of metal layer 46. The etch is performed in a laterally uniform manner. Accordingly, each aperture 52 is centered on the location of corresponding track segment 50B. The thickness of layer 48 is also reduced during the etch.

Figure 11D:
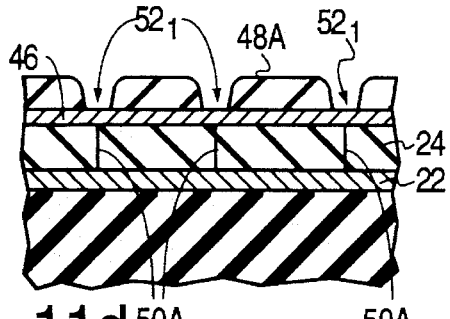
Figure 12D:
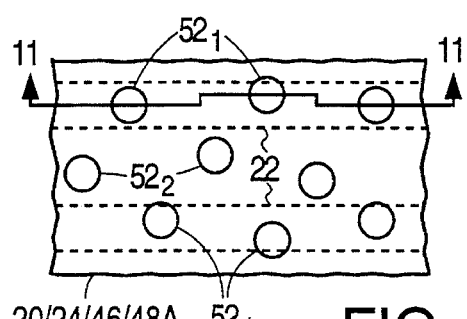

Apertures 52 are generally circular in shape as viewed from the top in the plan view of FIG. 12d. Apertures 52 are also usually somewhat wider at the top than at the bottom as indicated in FIG. 11d. The reason for slanting apertures 52 in this way is to facilitate subsequent reactive-ion etching of metal layer 46.

The second part of the insulating-material etch can be done with the etchant used during the first part or with another etchant. In either case, components 20, 22, 24, and 46 are not significantly attacked during the second part of the etch. Apertures 52 thereby reach an average diameter of 15–300, typically 140 nm, along the bottom of the reduced-thickness remainder 48A of insulating layer 48.

Figure 11E:
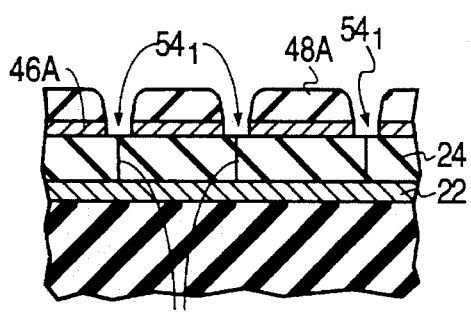
Figure 12E:
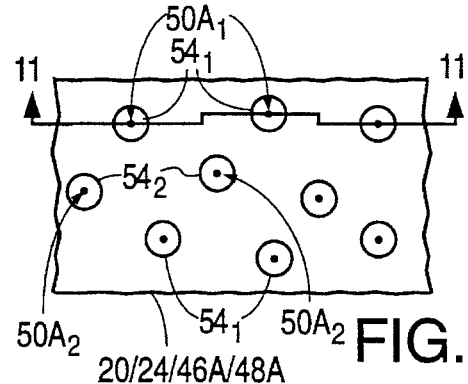

Using insulating layer 48A as an etch mask, the portions of metal layer 46 exposed through apertures 52 are removed with an anisotropic etchant to create generally circular openings down to insulating layer 24. FIGS. 11e and 12e depict the consequent structure in which openings $54_1$ extend through the portions of layer 46 located above lower conductive region 22, while openings $54_2$ extend through the portions of layer 46 not overlying region 22. The remainder 46A of layer 46 is the patterned gate electrode for the field emitter. The anisotropic etch is typically done according to a reactive-ion-etch technique.

The etchant utilized to create openings $54_1$ and $54_2$ (collectively "54") is controlled in such a way as to avoid significantly attacking other parts of the structure. Due to the anisotropic nature of the etch, each opening 54 is of largely the same transverse shape—i.e. generally circular-and of nearly the same diameter as corresponding aperture 52 (along the bottom of insulating layer 48A). Each opening 54 is vertically aligned with corresponding aperture 52. Since each aperture 52 is centered on the location of corresponding track segment 50B, each opening 54 is also centered on the location of corresponding segment 50B.

Insulating layer 48A is usually removed at some point subsequent to the creation of openings 54. As, for example, indicated in FIGS. 11f and 12f, layer 48A could be removed directly after openings 54 are formed.

Figure 11F:
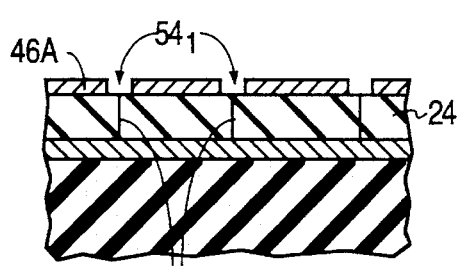
Figure 12F:
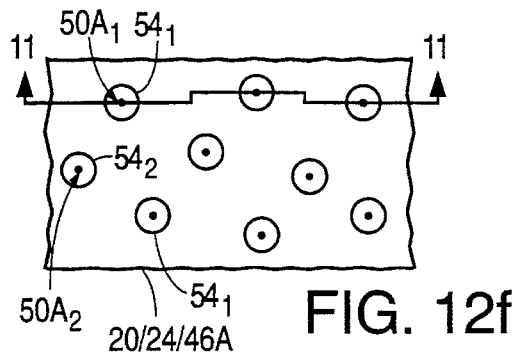
Figure 11G:
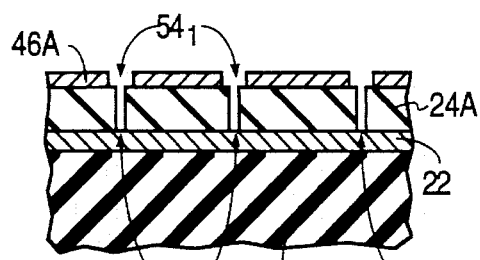
Figure 12G:
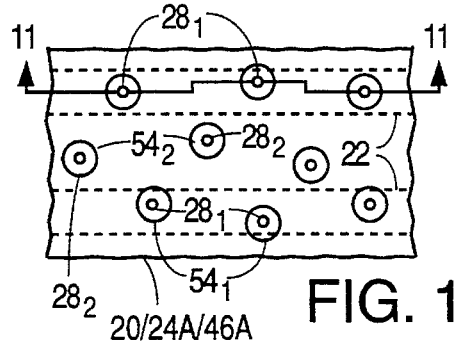

With portions of the upper surface of insulating layer 24 now exposed at track segments 50A, the structure is brought into contact with a chemical etchant that attacks the damaged material along segments 50A much more than the undamaged material of layer 24. Pores $28_1$ and $28_2$ are thereby created through layer 24 respectively along track segments $50A_1$ and $50A_2$ as indicated in FIGS. 11g and 12g. Pores $28_1$ and $28_2$ (again collectively "28") have the same physical/spatial characteristics, described above, as pores 28 in the previous manufacturing processes of the invention. The etch utilized to create pores 28 here is typically performed in the same manner as described above in connection with the structure of FIGS. 1d and 2d. The remainder of layer 24 again is porous insulating layer 24A.

Importantly, each pore 28 in FIGS. 11g and 12g is considerably narrower than corresponding opening 54. For example, when the bottom diameter of one of apertures 52 is 140 nm so that corresponding opening 54 is 150 nm in diameter, corresponding pore 28 typically has a diameter of 100 nm. Each pore 28 is centered on the location of corresponding track segment 50A. Because (a) each track segment 50B was in a straight line with corresponding track segment 50A and (b) each opening 54 is centered on the location of corresponding track segment 50B, each opening 54 is centered on corresponding pore 28.

Figure 11H:
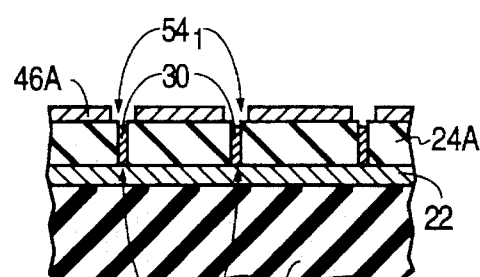
Figure 12H:
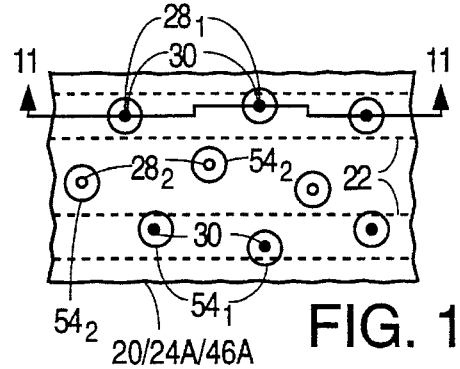

A suitable filament metal is now electrochemically deposited to form electron-emissive metal filaments 30 in pores $28_1$ overlying lower conductive region 22 as indicated in FIGS. 11h and 12h. The deposition is performed in the manner prescribed above in connection with the structure of FIGS. 1e and 2e. Since there is no electrical contact at the bottoms of pores $28_2$ located directly above substrate 20, substantially none of the filament metal accumulates in pores $28_2$. In FIG. 12h, the dark circles indicate pores $28_1$ filled with filaments 30, while the light circles indicate empty pores $28_2$. Although there are openings 54 for all of pores 28, the electrochemical nature of the process enables the deposition to be selective.

Filaments 30 again have the characteristics described above. Since pores $28_1$ are situated at random locations across porous layer 24, filaments 30 are again located in random places across layer 24. Due to the centering that results from the track formation and etching, filaments 30 are self-aligned to openings $54_1$ and therefore to gate electrode 46A.

As with the other cathode/gate structures of the invention, the cathode/gate structure of FIGS. 11h and 12h can be utilized directly as a field emitter. Nonetheless, it is again advantageous for filaments 30 to have sharpened tips that protrude out of the porous material. Accordingly, the structure of FIGS. 11h and 12h is further processed in the way described above for the other gated field emitters of the invention.

Figure 11I:
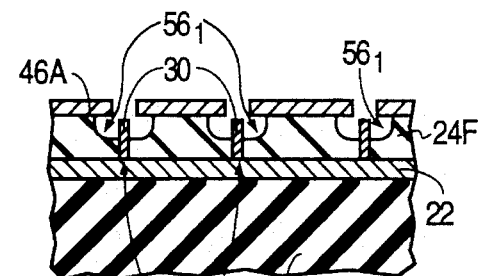
Figure 12I:
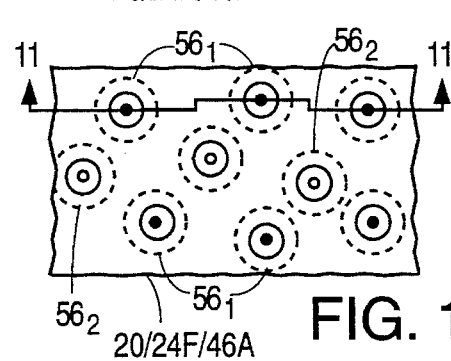

Portions of porous layer 24A exposed through openings $54_1$ are removed with an isotropic etchant to form cavities $56_1$ around filaments 30 as indicated in FIGS. 11i and 12i. Because gate layer 46A also has openings $54_2$, portions of layer 24A exposed through openings $54_2$ are simultaneously removed to form cavities $56_2$. Cavities $56_1$ and $56_2$ (collectively "56") can extend partway, or all the way, down to lower conductive region 22. FIG. 11i indicates the former case. In both cases, filaments 30 now protrude outward beyond the remainder 24F of porous layer 24A.

Figure 11J:
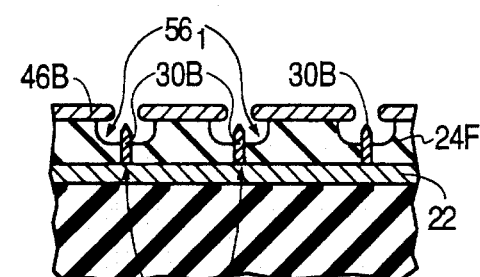
Figure 12J:
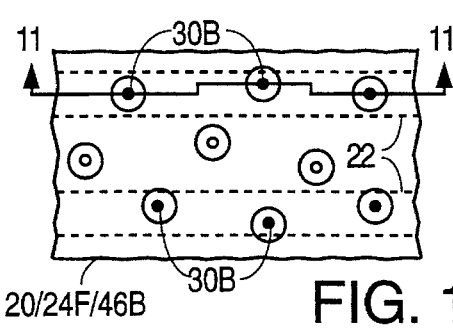

The upper ends of filaments 30 are sharpened by performing an electropolishing and etching operation. An electropolishing step to round the edges of patterned gate layer 46A overlying cavities 56 completes the basic fabrication of the field emitter. FIGS. 11j and 12j show the final structure in which items 30B are the sharpened remainders of filaments 30. Item 46B is the edge-rounded remainder of gate layer 46A.

Openings 54 can alternatively be created by etching through holes whose diameter is considerable smaller than openings 54 rather than using apertures 52 whose diameter is approximately the same as openings 54. FIGS. 13a and 13b depict how this alternative is implemented starting from the structure of FIG. 11c.

After charged-particle track segments 50B are created through insulating layer 48, relatively narrow pores $58_1$ are created along track segments $50B_1$ by bringing the structure into contact with an etchant that attacks the damaged material of insulating layer 48 much more than the undamaged material. Pores $58_1$ extend down to metal layer 46 as depicted in FIG. 13a. Relatively narrow pores $58_2$ (not shown) are similarly created along track segments $50B_2$ down to region 46. Item 48B in FIG. 13a is the remainder of insulating layer 48.

The portions of metal layer 46 exposed through pores $58_1$ are then removed with an isotropic etchant that attacks metal layer 46 much more than insulating layers 24 and 48B to form openings $54_1$ down to layer 24. Due to the isotropic nature of the etch, openings $54_1$ extend slightly under layer 48B as shown in FIG. 13b. The portions of layer 46 exposed through openings $58_2$ are simultaneously removed to create openings $54_2$ (not shown) in the same way as openings $54_1$. Item 46A is again the remainder of layer 46. From this point on, the structure is further processed in the manner described above for FIGS. 11f–11j.

FIGS. 14 and 15 illustrate the starting point for manufacturing certain implementations of the present field emitter in which lower conductive region 22 consists of a highly conductive layer 22A situated under a highly resistive (but still conductive) layer 22B. As shown in FIG. 15, each of the lines that form region 22 consists of segments of both of layers 22A and 22B. Highly conductive layer 22A consists of one or more of the materials described above for layer 22. Resistive layer 22B is typically formed with cermet or doped polycrystalline silicon.

FIGS. 16.1 and 16.2 depict how the final structures of, for example, FIGS. 3b and 11j appear when lower conductive region 22 consists of highly conductive layer 22A and highly resistive layer 22B. The lower ends of sharpened filaments 30A or 30B contact resistive layer 22B. The resistance between each filament 30A or 30B and layer 22A is typically 100 megaohms.

The processing techniques utilized in fabricating the gated field emitter of FIGS. 11a–11j and 12a–12j can be readily extended to create a gated field-emission structure having one or more additional control electrodes above the gate electrode. Moving to FIGS. 17a–17l, they illustrate how a gated field emitter having a focusing control electrode is so manufactured. This field emitter is also suitable for flat-panel television applications.

Figure 17A:
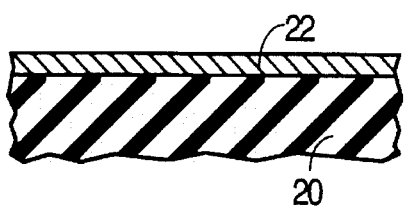
FIG. 17a, 17b, 17c, 17d, 17e, 17f, 17g, 17h, 17i, 17j, 17k, and 17l are cross-sectional front structural views representing steps in manufacturing a gated field-emission structure that incorporates a focusing electrode according to the invention.
Figure 17D:
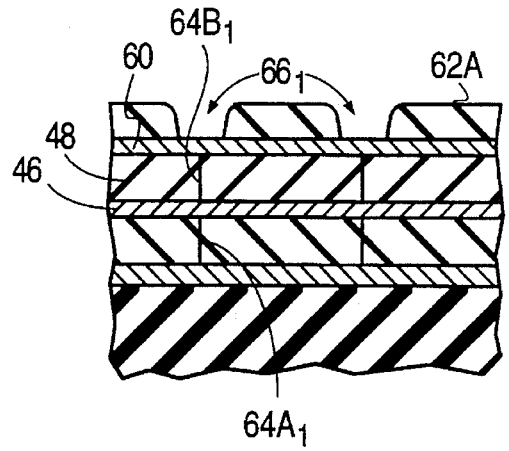

The field emitter is built on insulating substrate 20 over which lower conductive region 22 is provided as shown in FIG. 17a. Insulating layer 24, metal layer 46, and second insulating layer 48 are formed in sequence on the top of the structure. See FIG. 17b. Components 20, 22, 24, 46, and 48 all have the characteristics described above.

Figure 17B:
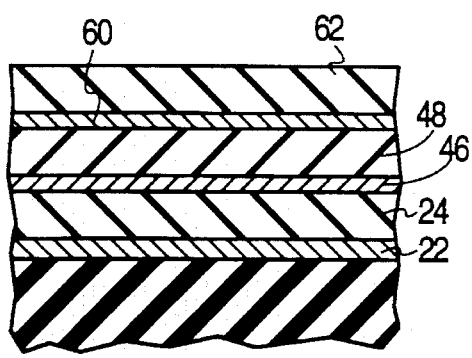

Continuing with FIG. 17b, a second electrically conductive layer 60 is formed on the top of second insulating layer 48. Conductive layer 60 later becomes the focusing electrode. A further electrically insulating layer 62 is formed on the top of layer 60. Layers 62 and 60 respectively have largely the same characteristics as insulating layer 48 and metal layer 46. Accordingly, layer 60 consists of insulating material, and layer 62 consists of metal.

The structure is subjected to energetic charged particles traveling in a direction largely perpendicular to the (unshown) lower substrate surface and thus in a direction generally perpendicular to the upper structural surface. The charged particles pass through layers 62, 60, 48, 46, and 24 and into the underlying material to form straight tracks through insulating layers 62, 48, and 24. See FIG. 17c.

Figure 17E:
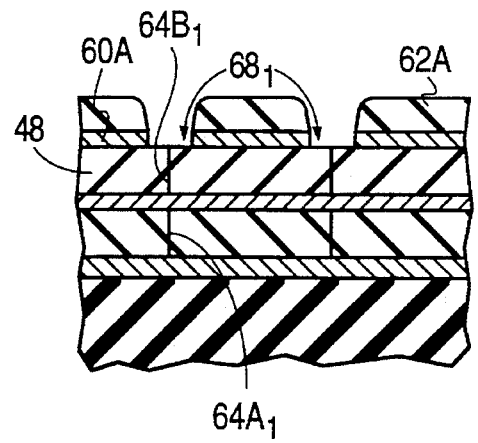
Figure 17C:
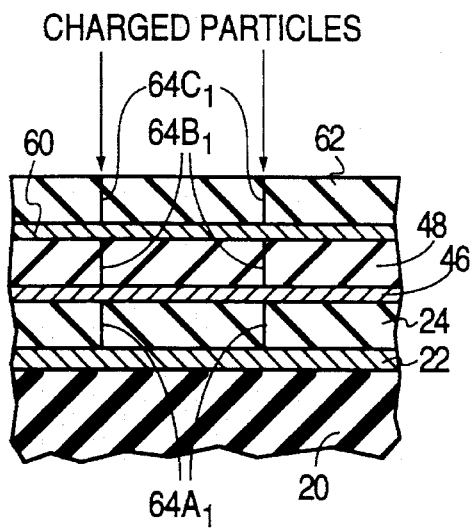

Reference symbols beginning with "64" are employed to indicate the charged-particle tracks in FIG. 17c. Each track is divided into (a) a "64A" segment extending through insulating layer 24, (b) a "64B" segment extending through insulating layer 48, and (c) a "64C" segment extending through insulating layer 62. The charged particles do not cause any significant damage to metal layers 60 and 46 and therefore do not create any tracks through layers 60 and 46. The tracks fall into two categories: (a) segments $64A_1$, $64B_1$, and $64C_1$ (collectively "$64_1$") extending respectively through portions of layers 24, 48, and 62 overlying lower conductive region 22, and (b) segments $64A_2$, $64B_2$, and $64C_2$ (collectively "$64_2$") extending respectively through portions of layers 24, 48, and 62 not overlying region 22. Track segments $64_2$, although not shown in the drawings, are analogous to track segments $50_2$—i.e., segments $50B_2$ and $50A_2$—depicted in FIGS. 12c and 12e for the previous manufacturing process of the invention.

Charged-particle tracks $64_1$ and $64_2$ (collectively "64") extend parallel to one another in a direction generally perpendicular to the upper structural surface. Tracks 64 have the same basic characteristics, and are formed in the same way, as tracks 50 and 26 described above.

Generally circular pores are formed through insulating layer 62 along track segments 64C down to metal layer 60 by bringing layer 62 into contact with a chemical etchant that attacks the damaged 64C track material much more than the undamaged material of layer 62. The pores are then broadened by continuing the etch into the undamaged material to form apertures $66_1$ and $66_2$ respectively along the pores created by etching tracks $64B_1$ and $64B_2$. See FIG. 17d. Apertures $66_2$, although not shown in the drawings, are analogous to apertures $52_2$ depicted in FIG. 12d.

The etching procedure utilized to create apertures $66_1$ and $66_2$ (collectively "66") is performed uniformly in largely the same manner as that described above for creating apertures 52, with one notable difference. The etch time for apertures 66 is somewhat longer than the etch time for apertures 52. Consequently, apertures 66 have substantially the same characteristics as apertures 52 but are larger in diameter. In particular, apertures 66 reach an average diameter of 20–400 nm, typically 190 nm, along the bottom of the remainder 62A of insulating layer 62.

Using insulating layer 62A as an etch mask, the portions of metal layer 60 exposed via apertures 66 are removed with an anisotropic etchant. Openings $68_1$ are thereby created down to insulating layer 48 through the portions of layer 60 overlying lower conductive region 22 as shown in FIG. 17e. Openings $68_2$ are simultaneously created down to layer 48 through portions of layer 60 not overlying region 22. Although not shown in the drawings, openings $68_2$ are analogous to openings $54_2$ depicted in FIG. 12e. The remainder 60A of metal layer 60 in FIG. 17e is the patterned focusing electrode for the field emitter.

The etch procedure utilized to form openings $68_1$ and $68_2$ (collectively "68") is typically performed in the same way as the metal etch employed to create openings 54 in the previous fabrication process of the invention. As a result, each opening 68 is centered on the location of corresponding track segment 64C.

Figure 17F:
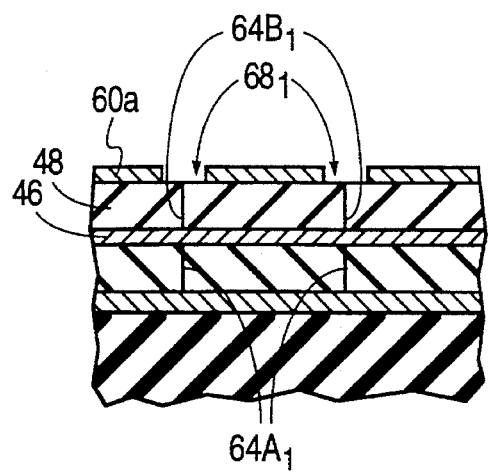

Insulating layer 62A is normally removed at some point after openings 68 are created. This can, for example, be done directly after the formation of openings 68. FIG. 17f shows the resultant structure.

Figure 17G:
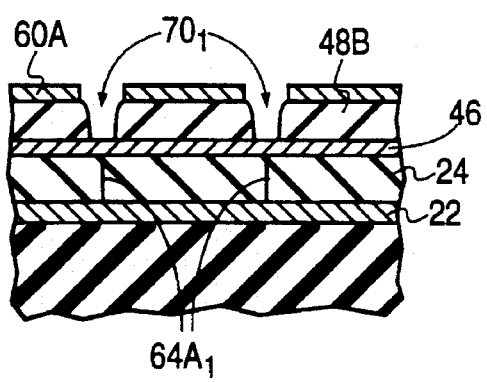
Figure 17J:
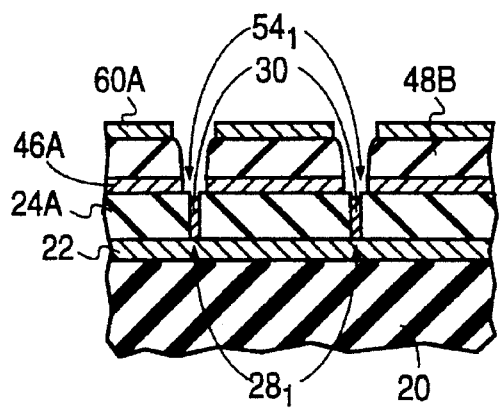

With portions of the upper surface of insulating layer 48 exposed at track segments 64B, pores are created in the damaged insulating material along segments 64B by bringing the structure into contact with a chemical etchant that attacks the damaged 64B track material much more than the undamaged material of layer 48. The etch is continued into the undamaged insulating material of layer 48 to broaden the pores. Apertures $70_1$ and $70_2$ are thereby created respectively along track segments $64B_1$ and $64B_2$. See FIG. 17g. Although not shown in the drawings, apertures $70_2$ are analogous to apertures $52_2$ shown in FIG. 12d. Item 48B in FIG. 17g is the remainder of layer 48.

The procedure for etching apertures $70_1$ and $70_2$ (collectively "70") is performed uniformly in the manner described above for etching apertures 52 in the previous manufacturing process of the invention. Accordingly, apertures 70 have substantially the same characteristics as apertures 52, including the same average aperture diameter.

Figure 17H:
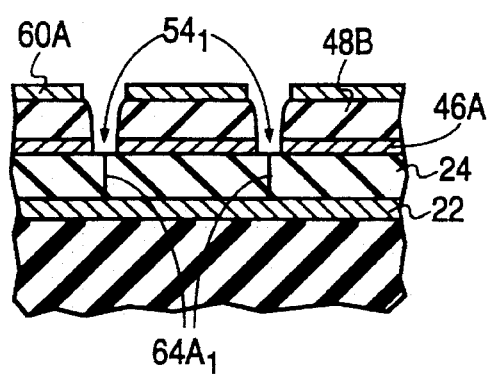

Using insulating layer 48B as an etch mask, the portions of metal layer 46 exposed via apertures $70_1$ are removed with an anisotropic etchant to create generally circular openings $54_1$ down to portions of insulating layer 24 that overlie lower conductive region 22 as shown in FIG. 17h. The portions of layer 46 exposed via apertures $70_2$ are simultaneously removed to create generally circular openings $54_2$ down to the portions of layer 24 situated directly above region 22. Although not shown in FIG. 17h, openings $54_2$ are analogous to openings $54_2$ depicted in FIG. 12g. The remaining portion 46A of gate layer 46 in FIG. 17h is again the gate electrode for the field emitter.

The etch technique employed to create openings 54 here is performed in the same way as in the previous fabrication process of the invention. Accordingly, each opening 54 is centered on the location of corresponding track segment 64B.

Except for the presence of metal layer 60A and insulating layer 48B, the structure of FIG. 17h is substantially the same as the structure of FIG. 11f. Track segments $64A_1$ in FIG. 17h are the same as track segments $50A_1$ in FIG. 11f. Subject to some additional processing on layers 60A and 48B, the structure of FIG. 17h is further processed in the same way as the structure of FIG. 11f. FIGS. 17i–17l respectively correspond to FIGS. 11g–11j. The processing description presented above in connection with FIGS. 11g–11j applies directly to FIGS. 17i–17l with each track segment "50A" now being referred to as "64A".

Figure 17K:
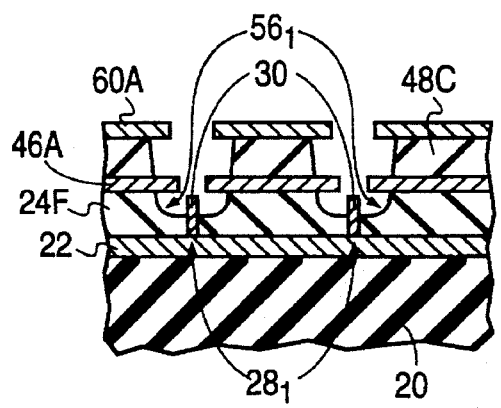
Figure 17I:
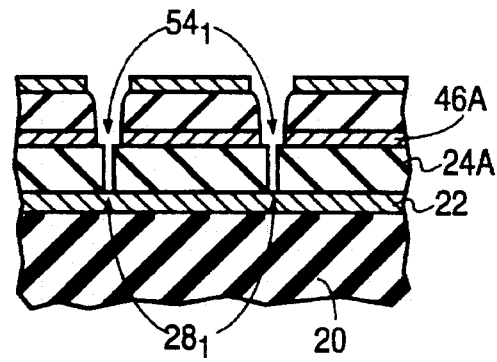

The exposed portions of insulating layer 48B below the edges of focusing electrode 60A are partially etched back. Depending on the properties of layers 48B and 24A, this etchback is either performed during the etch to create cavities 56 in porous insulating layer 24A or as a separate step. As indicated in FIG. 17k, the edges of layer 60A extend laterally beyond the remainder 48C of insulating layer 48B. Item 24F is again the remainder of porous layer 24A.

Figure 17L:
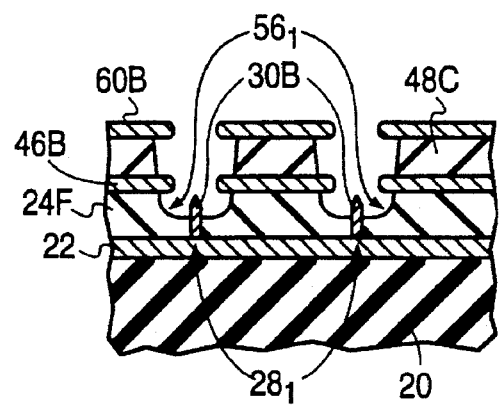

The edges of focusing layer 60A are typically rounded during the same electropolishing step used to round the edges of gate layer 46A. Item 60B in FIG. 17l is the rounded-edge patterned remainder of focusing layer 60A. Item 46B is again the rounded-edge patterned remainder of gate layer 46A. Likewise, items 30B are again the sharpened filaments. By virtue of the centering that arises from the track formation and etching, gate electrode 46B and focusing electrode 60B are both self-aligned to filaments 30B.

Lower conductive region 22 in FIG. $17_l$ may again consist of highly resistive layer 22A and overlying highly conductive layer 22B as described above. Also, the steps employed to create focusing electrode 60B above insulating layer 46B can be repeated to create one or more further control electrodes above layer 60B. In doing so, the centering that results from the track formation and etching enables each further control electrode to be self-aligned to filaments 30B.

FIGS. 18.1–18.4 illustrate several longitudinal shapes that filaments 30A or 30B can have in the present invention. As indicated in FIGS. 18.1 and 18.2, filaments 30A/30B can be solid cylinders except at their upper ends. If tracks 26 are etched in such a manner as to create pores 28 as cones, filaments 30A/30B can be solid cones which taper down in transverse cross section from just below their upper ends to their lower ends in the manner shown in FIGS. 18.3 and 18.4. Depending on how the electropolishing and etching operation is done, the electron-emissive tips at the upper ends of filaments 30A/30B can be generally rounded as indicated in FIGS. 18.1 and 18.3 or sharply pointed as indicated in FIGS. 18.2 and 18.4.

FIG. 19 depicts the electrochemical deposition system employed during the electrochemical deposition operations described above. The electrochemical system consists of an electrochemical cell 72 and a power supply and control system 74. In turn, electrochemical cell 72 consists of cell electrolyte 76, a surrounding sidewall 78, an O-ring 80, an anode 82, and a cathode 84 formed by part of the structure on which metal is being deposited. For the electrochemical depositions described above, cathode 84 includes lower conductive substrate 20 to which power supply and control system 74 is connected. FIG. 19 specifically illustrates the filament deposition. The set-up is the same for the cap deposition.

The electrochemical system shown in FIG. 19 operates according to a constant-current technique. Alternatively, a constant-voltage electrochemical deposition system could be used.

The field emitters of the present invention operate in the following way. An anode (or collector) structure is situated a short distance away from the top of each field emitter. A voltage is applied between a selected part of the anode and a selected one of the lines that forms lower conductive region 22. The particular filaments 30 above the selected line then emit electrons collected at the anode structure. The gate electrode in the gated implementations is used to extract electrons from the filaments and control the magnitude of the electron beam. The focusing electrode, when present, focuses the electron beam.

Directional terms such as "lower" and "down" have been employed in describing the present invention to establish a frame of reference by which the reader can more easily understand how the various parts of the invention fit together. In actual practice, the components of a field emitter may be situated at orientations different from that implied by the directional terms used here. The same applies to the way in which the fabrication steps are performed in the invention. Inasmuch as directional terms are used for convenience to facilitate the description, the invention encompasses implementations in which the orientations differ from those strictly covered by the directional terms employed here.

While the invention has been described with reference to particular embodiments, this description is solely for the purpose of illustration and is not to be construed as limiting the scope of the invention claimed below. For example, substrate 20 could be deleted if lower conductive region 22 is a continuous layer of sufficient thickness to support the structure. Insulating substrate 20 could be replaced with a composite substrate in which a thin insulating layer overlies a relatively thick non-insulating layer that furnishes the necessary structural support. Substrate 20 and/or conductive region 22 could be formed under insulating layer 24 after charged-particle tracks 26 are formed through it. Gate layer 34B, 40B or 46B could be patterned into lines running perpendicular to the lines that form region 22.

The electrochemical depositions could be performed by a full immersion technique with the sides of the field emitter suitably protected to avoid unwanted deposition. Thermal annealing could be used to modify the filament shape. Various modifications and applications may thus be made by those skilled in the art without departing from the true scope and spirit of the invention as defined in the appended claims.

What is claimed is:

1. A method comprising the steps of:

creating a structure in which a porous electrically insulating layer lies over a patterned lower electrically conductive region comprising a group of generally parallel lines situated over electrically insulating material of a substrate, a multiplicity of pores extending through the porous layer down to the lower conductive region, the pores having an average diameter of no more than 200 nm; and subsequently introducing electrically conductive filament material into the pores to form corresponding electron-emissive filaments therein, the lower end of each filament contacting the lower conductive region.

2. A method as in claim 1 wherein the substrate comprises a plate having an average thickness of at least 500 microns.

3. A method as in claim 1 wherein the creating step comprises:

forming charged-particle tracks through an initial electrically insulating layer situated over the lower conductive region; and etching the initial layer along the charged-particle tracks to form pores through the initial layer, the porous layer comprising the remainder of the initial layer.

4. A method as in claim 1 wherein the introducing step comprises electrochemically depositing the filament material into the pores starting from the lower conductive region.

5. A method as in claim 1 further including the step of providing an anode structure above, and spaced vertically apart from, the filaments for collecting electrons emitted from the filaments.

6. A method as in claim 1 further including the step of electropolishing the filaments to make them more uniform in length.

7. A method comprising the steps of:

creating a structure in which a porous electrically insulating layer lies over a lower electrically conductive region situated over electrically insulating material of a substrate, a multiplicity of pores extending through the porous layer down to the lower conductive region;

subsequently introducing electrically conductive filament material into the pores to form corresponding electron-emissive filaments therein, the lower end of each filament contacting the lower conductive region; and subsequently providing a patterned electrically conductive gate layer over specified material of the porous layer, openings respectively extending through the gate layer at locations generally centered on the filaments such that the filaments are separated from the gate layer.

8. A method as in claim 7 further including the step of removing material of the porous layer exposed through the openings to form cavities situated around the filaments so that the filaments extend outward beyond the remainder of the porous layer, the cavities extending at least partway down to the lower conductive region.

9. A method as in claim 8 wherein the removing step is performed after the providing step and wherein, prior to the providing step, the insulating layer contacts the filaments at their upper ends.

10. A method comprising the steps of:

creating a structure in which a patterned electrically conductive gate layer is situated over a porous electrically insulating layer that lies over a lower electrically conductive region situated over electrically insulating material of a substrate, a multiplicity of pores extending through the porous layer down to the lower conductive region, openings respectively extending through the gate layer at locations generally centered on the pores, each opening being wider than the corresponding pore; and subsequently introducing electrically conductive filament material into the pores to form corresponding electron-emissive filaments therein, the lower end of each filament contacting the lower conductive region.

11. A method as in claim 10 further including the step of removing material of the porous layer exposed through the openings to form cavities situated around the filaments so that the filaments extend outward beyond the remainder of the porous layer, the cavities extending at least partway down to the lower conductive region.

12. A method as in claim 11 wherein the removing step is performed after the creating step and wherein, prior to the creating step, the insulating layer contacts the filaments at their upper ends.

13. A method comprising the steps of:

creating a structure in which an electrically insulating porous layer lies over a lower electrically conductive region situated over electrically insulating material of a substrate, the lower conductive region comprising a highly resistive portion and a highly conductive portion situated under the highly resistive portion, a multiplicity of pores extending through the porous layer down to the highly resistive portion; and subsequently introducing electrically conductive filament material into the pores to form corresponding electron-emissive filaments therein, the lower end of each filament contacting the highly resistive portion.

14. A method as in claim 13 wherein the lower conductive region is a patterned layer comprising a group of generally parallel lines, each being formed with segments of both portions of the lower conductive region.

15. A method as in claim 13 wherein the creating step comprises:

forming charged-particle tracks through an initial electrically insulating layer situated over the lower conductive region; and etching the initial layer along the charged-particle tracks to form pores through the initial layer, the porous layer comprising the remainder of the initial layer.

16. A method as in claim 13 wherein the introducing step comprises electrochemically depositing the filament material into the pores starting from the lower conductive region.

17. A method comprising the steps of:

creating a structure in which a porous electrically insulating layer lies over a patterned lower electrically conductive region comprising a group of generally parallel lines situated over electrically insulating material of a substrate, a multiplicity of pores extending through the porous layer down to the lower conductive region;

subsequently introducing electrically conductive filament material into the pores to form corresponding electron-emissive filaments therein, the lower end of each filament contacting the lower conductive region; and providing an anode structure above, and spaced vertically apart from, the upper ends of the filaments for collecting electrons emitted from the filaments.

18. A method as in claim 17 wherein the substrate comprises a plate having an average thickness of at least 500 microns.

19. A method as in claim 17 wherein the creating step comprises:

forming charged-particle tracks through an initial electrically insulating layer situated over the lower conductive region; and etching the charged-particle tracks to form pores through the initial layer, the porous layer comprising the remainder of the initial layer.

20. A method as in claim 17 wherein the introducing step comprises electrochemically depositing the filament material into the pores starting from the lower conductive region.

21. A method as in claim 17 further including the step of providing a patterned electrically conductive gate layer over specified material of the porous layer, openings respectively extending through the gate layer at locations generally centered on the filaments such that the filaments are separated from the gate layer.

22. A method as in claim 21 further including the step of removing material of the porous layer exposed through the openings to form cavities situated around the filaments so that the filaments extend outward beyond the remainder of the porous layer, the cavities extending at least partway down to the lower conductive region.

23. A method as in claim 17 wherein the creating step entails creating the structure so as to include a patterned electrically conductive gate layer situated over the porous layer, openings respectively extending through the gate layer at locations generally centered on the pores, each opening being wider than the corresponding pore.

24. A method as in claim 23 further including the step of removing material of the porous layer exposed through the openings to form cavities situated around the filaments so that the filaments extend outward beyond the remainder of the porous layer, the cavities extending at least partway down to the lower conductive region.

25. A method comprising the steps of:

creating a structure in which a porous electrically insulating layer lies over a lower electrically conductive region, a multiplicity of pores extending through the porous layer down to the lower conductive region;

introducing electrically conductive filament material into the pores to form corresponding electron-emissive filaments therein, the lower end of each filament contacting the lower conductive region.

electropolishing the filaments to make them more uniform in length.

26. A method as in claim 25 further including, subsequent to the electropolishing step, the step of sharpening the upper ends of the filaments to form sharpened tips.

27. A method as in claim 25 wherein the creating step comprises:

forming charged-particle tracks through an initial electrically insulating layer situated over the lower conductive region; and etching the charged-particle tracks to form pores through the initial layer, the porous layer comprising the remainder of the initial layer.

28. A method as in claim 25 wherein the introducing step comprises electrochemically depositing the filament material into the pores starting from the lower conductive region.

29. A method as in claim 25 further including the step of providing a patterned electrically conductive gate layer over specified material of the porous layer, openings respectively extending through the gate layer at locations generally centered on the filaments such that the filaments are separated from the gate layer.

30. A method as in claim 29 further including the step of removing material of the porous layer exposed through the openings to form cavities situated around the filaments so that the filaments extend outward beyond the remainder of the porous layer, the cavities extending at least partway down to the lower conductive region.

31. A method as in claim 25 wherein the creating step entails creating the structure so as to include a patterned electrically conductive gate layer situated over the porous layer, openings respectively extending through the gate layer at locations generally centered on the pores, each opening being wider than the corresponding pore.

32. A method as in claim 31 further including the step of removing material of the porous layer exposed through the openings to form cavities situated around the filaments so that the filaments extend outward beyond the remainder of the porous layer, the cavities extending at least partway down to the lower conductive region.

33. A method comprising the steps of:

creating a structure in which a porous electrically insulating layer lies over a lower electrically conductive region, a multiplicity of pores extending through the porous layer down to the lower conductive region;

subsequently introducing electrically conductive filament material into the pores to form corresponding electron-emissive filaments therein, the lower end of each filament contacting the lower conductive region; and subsequently providing a patterned electrically conductive gate layer over specified material of the porous layer, openings respectively extending through the gate layer at locations generally centered on the filaments such that the filaments are separated from the gate layer.

34. A method as in claim 33 wherein the creating step comprises:

forming charged-particle tracks through an initial electrically insulating layer situated over the lower conductive region; and etching the initial layer along the charged-particle tracks to form pores through the initial layer and thereby convert it into the porous layer.

35. A method as in claim 33 wherein the introducing step comprises electrochemically depositing the filament material into the pores starting from the lower conductive region.

36. A method as in claim 33 wherein the providing step comprises:

producing electrically conductive caps over the upper ends of the filaments, each cap being situated over one of the filaments and having a lateral periphery that encloses the lateral periphery of the underlying filament along the bottom of that cap;

removing part of the thickness of the porous layer;

depositing electrically conductive gate material over the remainder of the porous layer in the space generally below the space between the caps; and removing the caps including any of the gate material on the caps, whereby the gate layer comprises the remaining gate material.

37. A method as in claim 33 wherein the providing step comprises:

producing electrically conductive caps over the upper ends of the filaments, each cap being situated over one of the filaments and having a lateral periphery that encloses the lateral periphery of the underlying filament along the bottom of that cap;

forming the gate layer in the space between the caps; and substantially removing the caps.

38. A method as in claim 37 wherein the forming step comprises:

depositing a blanket layer of electrically conductive gate material over the porous layer and the caps; and selectively removing the gate material over the caps so as to expose them, whereby the gate layer comprises the remaining gate material.

39. A method as in claim 33 wherein each opening is wider than the corresponding filament.

40. A method as in claim 33 further including the step of removing material of the porous layer exposed through the openings to form cavities situated around the filaments so that the filaments extend outward beyond the remainder of the porous layer, the cavities extending at least partway down to the lower conductive region.

41. A method as in claim 40 further including the step of electropolishing the filaments to make them more uniform in length.

42. A method as in claim 40 further including the step of sharpening the upper ends of the filaments.

43. A method as in claim 40 further including the step of electropolishing the edges of the gate layer at the openings.

44. A method comprising the steps of:

creating a structure in which a porous electrically insulating layer lies over a lower electrically conductive region, a multiplicity of pores extending through the porous layer down to the lower conductive region, each pore containing an electron-emissive filament that contacts the lower conductive region at the lower end of the filament;

producing electrically conductive caps over the upper ends of the filaments, each cap being situated over one of the filaments and having a lateral periphery that encloses the lateral periphery of the underlying filament along the bottom of that cap;

removing part of the thickness of the porous layer;

depositing electrically conductive gate material over the remainder of the porous layer in the space generally below the space between the caps;

substantially removing the caps including any of the gate material on the caps, whereby the remaining gate material substantially forms a patterned gate layer through which openings respectively extend at locations generally centered on the filaments such that the filaments are separated from the gate layer; and removing portions of the porous layer exposed through the openings to form cavities around the filaments so that the filaments extend outward beyond the remainder of the porous layer, the cavities extending at least partway down to the lower conductive region.

45. A method as in claim 44 wherein the creating step entails electrochemically depositing electrically conductive filament material into the pores starting from the lower conductive region.

46. A method as in claim 44 wherein the producing step comprises electrochemically depositing the caps.

47. A method comprising the steps of:

creating a structure in which a porous electrically insulating layer lies over a lower electrically conductive region, a multiplicity of pores extending through the porous layer down to the lower conductive region, each pore containing an electron-emissive filament that contacts the lower conductive region at the lower end of the filament;

producing electrically conductive caps over the upper ends of the filaments, each cap being situated over one of the filaments and having a lateral periphery that encloses the lateral periphery of the underlying filament along the bottom of that cap;

depositing a blanket layer of electrically conductive gate material over the porous layer and the caps;

selectively removing the gate material over the caps so as to expose them;

substantially removing the caps, whereby the remaining gate material substantially forms a patterned gate layer through which openings respectively extend at locations generally centered on the filaments such that the filaments are separated from the gate layer; and removing portions of the porous layer exposed through the openings to form cavities around the filaments so that the filaments extend outward beyond the remainder of the porous layer, the cavities extending at least partway down to the lower conductive region.

48. A method as in claim 47 wherein the creating step entails electrochemically depositing electrically conductive filament material into the pores starting from the lower conductive region.

49. A method as in claim 47 wherein the producing step comprises electrochemically depositing the caps.

50. A method as in claim 47 wherein the selectively removing step entails performing a planarization operation to provide the combination of the gate layer and the caps with a largely flat upper surface.

51. A method comprising the steps of:

creating a structure in which an electrically conductive gate layer lies over an initial electrically insulating layer situated over a lower electrically conductive region, openings extending through the gate layer to expose corresponding surface portions of the insulating layer;

subsequently forming a multiplicity of pores through the insulating layer down to the lower conductive region, each pore being formed through part of the exposed surface portion of a corresponding one of the openings such that each pore is generally centered on the corresponding opening and is considerably narrower than the corresponding opening along the bottom of the gate layer; and subsequently introducing electrically conductive filament material into the pores to form corresponding electron-emissive filaments separated from the gate layer, the lower end of each filament contacting the lower conductive region.

52. A method as in claim 51 wherein the creating step entails:
   providing the structure with (a) a second electrically insulating layer situated over the gate layer and (b) a second electrically conductive layer situated over the second insulating layer;
   forming openings through the second conductive layer down to the second insulating layer;
   forming corresponding apertures through the second insulating layer down to the gate layer such that each aperture is generally centered on the corresponding opening through the second conductive layer; and
   etching the gate layer through the apertures to form the openings therethrough such that each opening through the gate layer is generally centered on the corresponding aperture and on the corresponding opening through the second conductive layer.

53. A method as in claim 51 wherein the introducing step comprises electrochemically depositing the filament material into the pores starting from the lower conductive region.

54. A method comprising the steps of:
   creating a structure in which an electrically insulating layer lies over a lower electrically conductive region, an electrically conductive gate layer lies over the insulating layer, and a further layer lies over the gate layer;
   causing charged particles to pass through the three layers to form a multiplicity of charged-particle tracks down to the lower conductive region, each track comprising (a) a first segment extending through the insulating layer and (b) a second segment extending through the further layer in line with the first track segment;
   etching the further layer along the second track segments to form corresponding apertures through the further layer down to the gate layer;
   etching the gate layer through the apertures to form corresponding openings through the gate layer down to the insulating layer such that each opening is generally centered on the corresponding aperture;
   etching the insulating layer along the first track segments to form corresponding pores through the insulating layer down to the lower conductive region; and
   introducing electrically conductive filament material into the pores to form corresponding electron-emissive filaments separated from the gate layer, the lower end of each filament contacting the lower conductive region.

55. A method as in claim 54 wherein the introducing step comprises electrochemically depositing the filament material into the pores starting from the lower conductive region.

56. A method as in claim 54 further including the step of removing material of the insulating layer exposed through the openings to form cavities situated around the filaments so that the filaments extend outward beyond the remainder of the insulating layer, the cavities extending at least partway down to the lower conductive region.

57. A method as in claim 54 further including the step of electropolishing the filaments to make them more uniform in length.

58. A method as in claim 54 further including the step of sharpening the upper ends of the filaments.

59. A method as in claim 54 further including the step of electropolishing the edges of the gate layer at the openings.

60. A method comprising the steps of:
   creating a structure in which a first electrically insulating layer lies over a lower electrically conductive region, an electrically conductive gate layer lies over the first insulating layer, a second electrically insulating layer lies over the gate layer, a second electrically conductive layer lies over the second insulating layer, and a further layer lies over the second conductive layer;
   causing charged particles to pass through the five layers to form a multiplicity of charged-particle tracks down to the lower conductive region, each track comprising (a) a first segment extending through the first insulating layer, (b) a second segment extending through the second insulating layer, and (c) a third segment extending through the further layer in line with the other two track segments;
   etching the further layer along the third track segments to form corresponding apertures through the further layer down to the second conductive layer;
   etching the second conductive layer through the apertures in the further layer to form corresponding openings through the second conductive layer down to the second insulating layer such that each opening through the second conductive layer is generally centered on the corresponding aperture through the further layer;
   etching the second insulating layer along the second track segments to form corresponding apertures through the second insulating layer down to the gate layer;
   etching the gate layer through the apertures in the second insulating layer to form corresponding openings through the gate layer down to the first insulating layer such that each opening through the gate layer is generally centered on the corresponding aperture through the second insulating layer;
   etching the first insulating layer along the first track segments to form corresponding pores through the first insulating layer down to the lower conductive region; and
   introducing electrically conductive filament material into the pores to form corresponding electron-emissive filaments separated from the two conductive layers, the lower end of each filament contacting the lower conductive region.

61. A method comprising the steps of:
   creating a structure in which a porous layer is situated over a lower electrically conductive region, a multiplicity of pores extend through the porous layer down to the lower conductive region, electrically conductive filament material is situated in the pores to form corresponding electron-emissive filaments, the lower end of each filament contacts the lower conductive region, a patterned electrically conductive gate layer is situated over the porous layer, and openings respectively corresponding to the filaments extend through the gate layer at locations generally centered on the filaments such that the filaments are separated from the gate layer; and
   subsequently sharpening the upper ends of the filaments to form sharpened tips.

62. A method as in claim 61 wherein the filaments are generally straight and are oriented largely parallel to one another.

63. A method as in claim 62 wherein the transverse cross-sectional area of each filament is largely constant along its length except at its tip.

64. A method as in claim 62 wherein the filaments generally taper down in transverse cross-sectional area from just below their tips to their lower ends.

65. A method as in claim 61 wherein the upper ends of the filaments consist substantially of noble metal.

66. A method as in claim 61 further including the step of furnishing an electrically insulating substrate under the lower conductive region.

67. A method as in claim 61 wherein the creating step comprises:

provbiding an initial electrically insulating initial layer over the lower conductive region;

forming charged-particle tracks through the initial layer down to the lower conductive region; and etching the initial layer along the charged-particle tracks to form pores through the initial layer and thereby convert it into the porous layer.

68. A method as in claim 61 wherein the introducing step comprises electrochemically depositing electrically conductive filament material into the pores starting from the lower conductive region.

69. A method as in claim 61 further including, prior to the sharpening step, the step of electropolishing the filaments to round their upper ends.

70. A method comprising the steps of:

creating an electrically insulating layer over a lower electrically conductive region;

subsequently forming charged-particle tracks through the insulating layer;

etching the insulating layer along the charged-particle tracks to form a multiplicity of pores extending through the insulating layer down to the lower conductive region; and electrochemically introducing electrically conductive filament material into the pores starting from the lower conductive region to create corresponding electron-emissive filaments whose lower ends contact the lower conductive region.

71. A method as in claim 70 wherein the upper ends of the filaments consist substantially of noble metal.

72. A method as in claim 70 wherein the creating step entails creating the lower conductive region as a patterned layer comprising a group of generally parallel lines.

73. A method as in claim 70 further including the step of removing a thickness of the insulating layer sufficient to enable each filament to extend outward beyond the remainder of the structure.

74. A method as in claim 73 further including the step of sharpening the upper ends of the filaments.

75. A method as in claim 70 further including the step of providing a patterned electrically conductive gate layer over specified material of the porous layer, openings respectively extending through the gate layer at locations generally centered on the filaments such that the filaments are separated from the gate layer.

76. A method as in claim 70 further including the step of electropolishing the filaments to make them more uniform in length.

77. A method comprising the steps of:

creating a structure in which a porous layer is situated over a lower electrically conductive region, a multiplicity of pores extending through the porous layer down to the lower conductive region;

subsequently introducing electrically conductive filament material into the pores to form corresponding electron-emissive filaments therein, the lower end of each filament contacting the lower conductive region;

subsequently removing at least part of the thickness of the porous layer to enable each filament to extend outward beyond the remainder of the structure; and subsequently sharpening the upper ends of the filaments to form sharpened tips.

78. A method as in claim 77 wherein the removing step entails removing substantially all of the porous layer.

79. A method as in claim 77 wherein the upper ends of the filaments consist substantially of noble metal.

80. A method as in claim 77 wherein the filaments are generally straight and are oriented largely parallel to one another.

81. A method as in claim 77 wherein the creating step comprises:

providing an initial electrically insulating layer over the lower conductive region;

forming charged-particle tracks through the initial layer down to the lower conductive region; and etching the charged-particle tracks to form pores through the initial layer and thereby convert it into the porous layer.

82. A method as in claim 77 further including, prior to the sharpening step, the step of electropolishing the filaments to round their upper ends.

* * * * *